(12) United States Patent
Moteki et al.

(10) Patent No.: US 6,839,637 B2
(45) Date of Patent: *Jan. 4, 2005

(54) EXHAUST EMISSION CONTROL SYSTEM FOR INTERNAL COMBUSTION ENGINE

(75) Inventors: Norio Moteki, Wako (JP); Kotaro Miyashita, Wako (JP); Yuichiro Tanabe, Wako (JP); Mitsuo Hashizume, Wako (JP); Hiroaki Hasumi, Tochigi (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 106 days.

This patent is subject to a terminal disclaimer.

(21) Appl. No.: 10/146,042

(22) Filed: May 16, 2002

(65) Prior Publication Data

US 2002/0173919 A1 Nov. 21, 2002

(30) Foreign Application Priority Data

May 18, 2001 (JP) ........................................ 2001-149859

(51) Int. Cl.[7] .............................................. G01N 31/00
(52) U.S. Cl. ........................... 702/23; 702/32; 702/100; 702/179; 60/276; 60/285; 180/309; 477/100; 700/52; 700/71
(58) Field of Search ............................. 702/23–24, 27, 702/30–32, 100, 179, 51, 182, 183, 189, FOR 115, 116, 118, 119, 135, 155, 156, 171; 477/100; 180/309; 60/276, 285, 301; 700/9, 52, 71, 90, 108

(56) References Cited

U.S. PATENT DOCUMENTS 5,577,382 A * 11/1996 Kihara et al. ................. 60/276
5,655,363 A   8/1997 Ito et al.
6,237,330 B1 * 5/2001 Takahashi et al. ............ 60/285
6,263,666 B1 * 7/2001 Kubo et al. .................... 60/277
2002/0029562 A1 * 3/2002 Ishii et al. ..................... 60/277
2003/0021745 A1 * 1/2003 Chen ......................... 423/239.1
2003/0175192 A1 * 9/2003 Hu et al. ................... 423/239.1

FOREIGN PATENT DOCUMENTS

| DE | 10027347 A1 | 5/2001 |
| DE | 10040010 A1 | 2/2002 |
| DE | 10146372 A1 | 4/2002 |
| EP | 0950 801 A1 | 10/1999 |
| EP | 1092 856 A2 | 4/2001 |
| JP | 8-144746 | 6/1996 |
| JP | 10-299460 | 11/1998 |

OTHER PUBLICATIONS

Lindhjem, "Exhaust Emission Effects of Fuel Sulfur and Oxygen on Gasoline Nonroad Engines", Nov. 1997, EPA, pp. 1–6.*
EPA Staff Paper, "Gasonline Sulfur Issues", May 1998, EPA, vol.:005, pp. 1–50.*
Japanese Patent Laid–Open No. Hei 8–144746.

* cited by examiner

Primary Examiner—Marc S. Hoff
Assistant Examiner—Elias Desta
(74) Attorney, Agent, or Firm—Arent Fox

(57) ABSTRACT

An exhaust emission control system for an internal combustion engine is disclosed. The system includes a NOx removing device provided in an exhaust system of the engine for removing NOx contained in exhaust gases, and an oxygen concentration sensor provided in the exhaust system. The air-fuel ratio of the air-fuel mixture to be supplied to the engine is changed from a value which is leaner than the stoichiometric ratio to a value which is richer than the stoichiometric ratio. It is determined whether or not a sulfur oxide concentration in the exhaust gases is high according to a transient characteristic of an oxygen concentration detected by the oxygen concentration sensor after the air-fuel ratio is changed.

30 Claims, 16 Drawing Sheets

EXHAUST EMISSION CONTROL SYSTEM FOR INTERNAL COMBUSTION ENGINE

BACKGROUND OF THE INVENTION

The present invention relates to an exhaust emission control system for an internal combustion engine, and more particularly to such an exhaust emission control system having a function of monitoring the concentration of sulfur oxide (SOx) contained in exhaust gases.

Conventionally known is a technique for removing NOx (nitrogen oxide) contained in exhaust gases by providing a NOx removing device including a NOx absorbent in an exhaust system of an internal combustion engine. Further, a technique of determining a degree of deterioration of the NOx removing device is known in the art (Japanese Patent Laid-open No. Hei 10-299460). In this technique, two oxygen concentration sensors are arranged upstream and downstream of the NOx removing device, and the air-fuel ratio of an air-fuel mixture to be supplied to the engine is changed from a lean region to a rich region with respect to the stoichiometric ratio. Then, the degree of deterioration of the NOx removing device is determined according to a delay time period from the time an output from the upstream oxygen concentration sensor has changed to a value indicative of the rich air-fuel ratio to the time an output from the downstream oxygen concentration sensor has changed to a value indicative of the rich air-fuel ratio.

However, when the concentration of SOx in the vicinity of each oxygen concentration sensor becomes high, an output characteristic of the oxygen concentration sensor changes. Accordingly, when the concentration of SOx in the vicinity of each oxygen concentration sensor is high, there is a case that the deterioration determination of the NOx removing device cannot be accurately performed. When the degree of enrichment of the air-fuel ratio is low, that is, when the air-fuel ratio after enrichment is near the stoichiometric ratio, the effect of SOx tends to become especially remarkable.

SUMMARY OF THE INVENTION

It is accordingly an object of the present invention to provide an exhaust emission control system which can determine a condition where the SOx concentration in the vicinity of each oxygen concentration sensor is high.

In order to attain the above object, the present invention provides an exhaust emission control system for an internal combustion engine, including NOx removing means, an oxygen concentration sensor, air-fuel ratio changing means, and sulfur oxide determining means. The NOx removing means is provided in an exhaust system of the engine, and removes NOx contained in exhaust gases when the air-fuel ratio of an air-fuel mixture to be supplied to the engine is set to a value leaner than a stoichiometric ratio. The oxygen concentration sensor is provided in the exhaust system and detects an oxygen concentration in the exhaust gases. The air-fuel ratio changing means changes the air-fuel ratio of the air-fuel mixture to be supplied to the engine from a value which is leaner than the stoichiometric ratio to a value which is richer than the stoichiometric ratio. The sulfur oxide determining means determines whether or not a sulfur oxide concentration in the exhaust gases is high according to a transient characteristic of the oxygen concentration detected by the oxygen concentration sensor after the air-fuel ratio is changed by the air-fuel ratio changing means.

More specifically, the condition where the sulfur oxide concentration is high corresponds to a condition that the sulfur oxide concentration in the exhaust gases is high enough to possibly have an effect on the output from the oxygen concentration sensor.

With this configuration, the air-fuel ratio is changed from a value which is leaner than the stoichiometric ratio to a value which is richer than the stoichiometric ratio, and it is determined whether or not the sulfur oxide concentration in the exhaust gases is high according to the transient characteristic of the detected oxygen concentration, after changing the air-fuel ratio as mentioned above. It has been experimentally confirmed that when the sulfur oxide concentration in the exhaust gases becomes high, the time period during which the oxygen concentration sensor output changes from a value indicative of a lean air-fuel ratio to a value indicative of a rich air-fuel ratio tends to increase or the oxygen concentration sensor output tends to change toward a lean region after once reaching a value indicative of a rich air-fuel ratio. By detecting such a tendency, the condition where the sulfur oxide concentration is high can be determined.

Preferably, the air-fuel ratio changing means changes the air-fuel ratio from a value which is leaner than the stoichiometric ratio to a value which is slightly richer than the stoichiometric ratio. The sulfur oxide determining means determines that the sulfur oxide concentration is high when a transient time period from the time the oxygen concentration detected by the oxygen concentration sensor has become lower than a first reference value, to the time the oxygen concentration detected by the oxygen concentration sensor reaches a second reference value, which is less than the first reference value, is longer than a predetermined transient time period.

With this configuration, the air-fuel ratio is changed from a value which is leaner than the stoichiometric ratio to a value which is slightly richer than the stoichiometric ratio. It is determined that the sulfur oxide concentration is high when the transient time period from the time the detected oxygen concentration has become lower than the first reference value to the time the detected oxygen concentration reaches the second reference value which is less than the first reference value, is longer than the predetermined transient time period. That is, the tendency that the time period during which the oxygen concentration sensor output changes from a value indicative of a lean air-fuel ratio to a value indicative of a rich air-fuel ratio increases, is detected, whereby the condition that the sulfur oxide concentration is high can be determined.

Preferably, the sulfur oxide determining means determines that the sulfur oxide concentration is high, when the oxygen concentration detected by the oxygen concentration sensor becomes lower than a concentration determination reference value, and thereafter exceeds the concentration determination reference, value within a predetermined time period from the time the oxygen concentration becomes lower than the concentration determination reference value.

With this configuration, it is determined that the sulfur oxide concentration is high when the detected oxygen concentration exceeds the concentration determination reference value within the predetermined time period, from the time the oxygen concentration becomes lower than the concentration determination reference value. That is, the tendency that the oxygen concentration sensor output changes toward a lean region after once reaching a value indicative of a rich air-fuel ratio, is detected; whereby the condition that the sulfur oxide concentration is high can be determined.

Preferably, the air-fuel ratio changing means changes the air-fuel ratio from a value which is leaner than the stoichiometric ratio to a value which is slightly richer than the stoichiometric ratio.

With this configuration, by setting the degree of enrichment of the air-fuel ratio with respect to the stoichiometric ratio to a small value, the oxygen concentration sensor output can be easily affected by the sulfur oxide. This improves the determination accuracy.

Preferably, the exhaust emission control system further includes deterioration determining means and inhibiting means. The deterioration determining means determines the deterioration of the NOx removing device according to the output from the oxygen concentration sensor. The inhibiting means inhibits the deterioration determination by the deterioration determining means when the sulfur oxide determining means determines that the sulfur oxide concentration is high.

With this configuration, the deterioration of the NOx removing means is determined according to the oxygen concentration sensor output by the deterioration determining means. The deterioration determination by the deterioration determining means is inhibited by the inhibiting means, when the sulfur oxide determining means determines that the sulfur oxide concentration is high. If the deterioration determination according to the oxygen concentration sensor output is performed in the condition where the effect of the sulfur oxide is large, there is a possibility of improper determination. Accordingly, by inhibiting the deterioration determination in such a case, improper determination can be prevented.

Preferably, the exhaust emission control system further includes sulfur oxide removing means. The sulfur oxide removing means executes a process for removing sulfur oxide accumulated in the NOx removing means when the sulfur oxide determining means determines that the sulfur oxide concentration is high.

With this configuration, the process for removing the sulfur oxide accumulated in the NOx removing means is executed, when the sulfur oxide determining means determines that the sulfur oxide concentration is high. Accordingly, it is possible to prevent improper determination such that a reduction in performance of the NOx removing means, due to the accumulation of the sulfur oxide, is improperly determined as an aged deterioration of the NOx removing means.

The present invention provides another exhaust emission control system for an internal combustion engine, including a three-way catalyst, NOx removing means, an oxygen concentration sensor, air-fuel ratio changing means, and sulfur oxide determining means. The three-way catalyst is provided in an exhaust system of the engine and purifies exhaust gases. The NOx removing means is provided downstream of the three-way catalyst and removes NOx contained in the exhaust gases when the air-fuel ratio of an air-fuel mixture to be supplied to the engine is set to a value leaner than a stoichiometric ratio. The oxygen concentration sensor is provided between the three-way catalyst and the NOx removing means and detects an oxygen concentration in the exhaust gases. The air-fuel ratio changing means changes the air-fuel ratio of the air-fuel mixture from a value which is leaner than the stoichiometric ratio to a value which is richer than the stoichiometric ratio. The sulfur oxide determining means determines whether or not a sulfur oxide concentration in the exhaust gases is high according to a transient characteristic of the oxygen concentration detected by the oxygen concentration sensor, after the air-fuel ratio is changed by the air-fuel ratio changing means.

With this configuration, the air-fuel ratio is changed from a value which is leaner than the stoichiometric ratio to a value which is richer than the stoichiometric ratio, and it is determined whether or not the sulfur oxide concentration in the exhaust gases is high according to the transient characteristic of the detected oxygen concentration, after changing the air-fuel ratio as mentioned above. It has been experimentally confirmed that when the three-way catalyst provided upstream of the oxygen concentration sensor is deteriorated, the sulfur oxide concentration on the downstream side of the three-way catalyst becomes high. As a result, the time period during which the oxygen concentration sensor output changes from a value indicative of a lean air-fuel ratio to a value indicative of a rich air-fuel ratio tends to increase or the oxygen concentration sensor output tends to change toward a lean region after once reaching a value indicative of a rich air-fuel ratio. By detecting such a tendency, the condition where the sulfur oxide concentration on the downstream side of the three-way catalyst is high can be determined.

Preferably, the sulfur oxide determining means determines that the sulfur oxide concentration is high, when the oxygen concentration detected by the oxygen concentration sensor becomes lower than a first reference value and fails to reach a second reference value, which is less than the first reference value, within a predetermined time period elapsed from the time the oxygen concentration becomes lower than the first reference value.

With this configuration, it is determined that the sulfur oxide concentration is high when the detected oxygen concentration fails to reach the second reference value, which is less than the first reference value, within the predetermined time period elapsed from the time the detected oxygen concentration has become lower than the first reference value. That is, the tendency that the time period during which the oxygen concentration sensor output changes from a value indicative of a lean air-fuel ratio to a value indicative of a rich air-fuel ratio increases is detected; whereby the condition where the sulfur oxide concentration is high can be determined.

DETAILED DESCRIPTION OF THE PREFERRED EMBODIMENTS

Some preferred embodiments of the present invention will now be described with reference to the drawings.

First Prefered Embodiment

Figure 1:
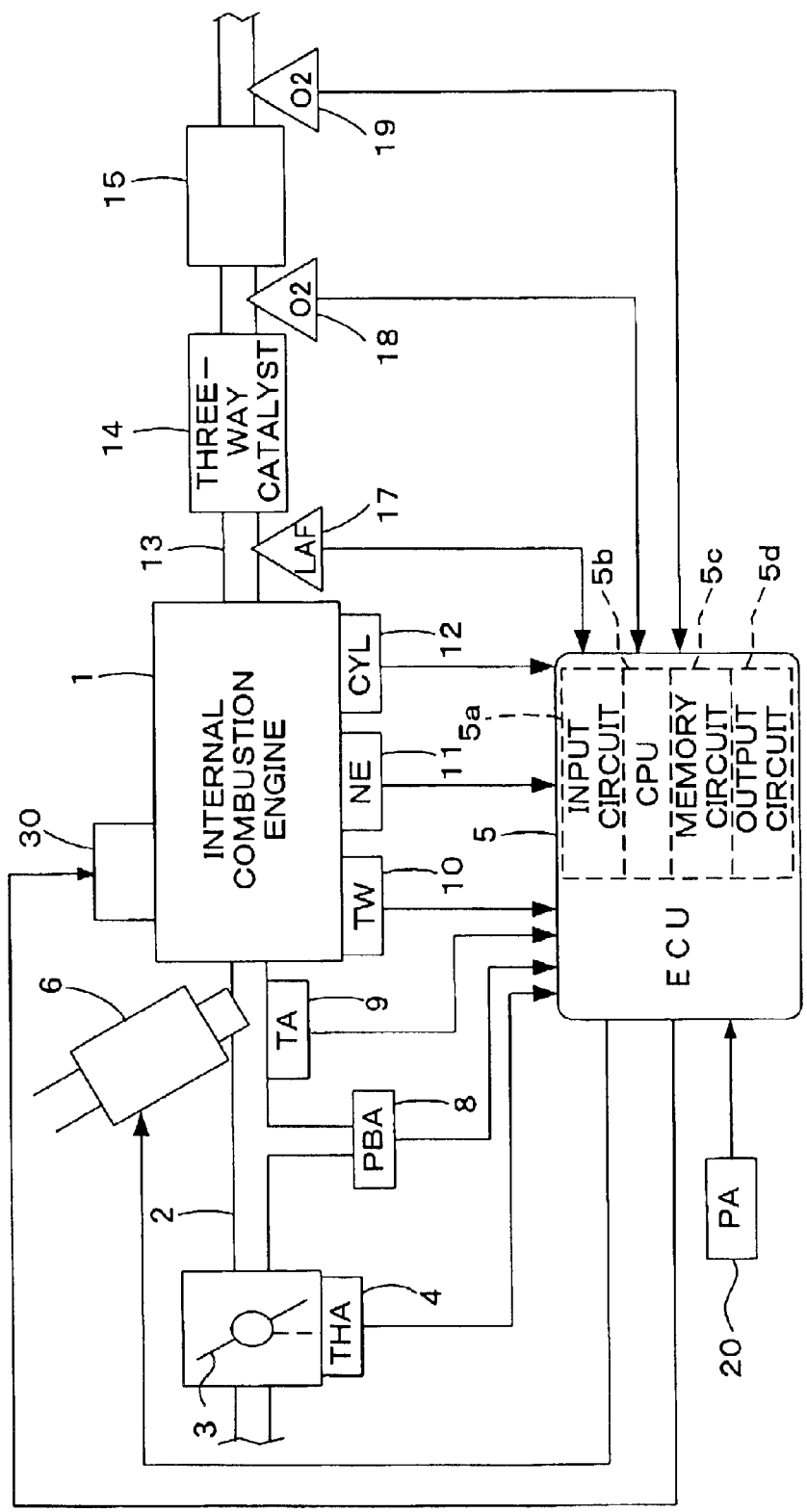
FIG. 1 is a schematic diagram showing the configuration of an internal combustion engine and a control system therefor according to a first preferred embodiment of the present invention.

Referring to FIG. 1, there is schematically shown a general configuration of an internal combustion engine (which will be hereinafter referred to as "engine") and a control system therefor, including an exhaust emission control system according to a first preferred embodiment of the present invention. The engine is a four-cylinder engine 1, for example, and it has an intake pipe 2 provided with a throttle valve 3. A throttle valve opening (THA) sensor 4 is connected to the throttle valve 3, so as to output an electrical signal corresponding to an opening of the throttle valve 3 and supply the electrical signal to an electronic control unit (which will be hereinafter referred to as "ECU") 5 for controlling the engine 1.

Fuel injection valves 6, only one of which is shown, are inserted into the intake pipe 2 at locations intermediate between the cylinder block of the engine 1 and the throttle valve 3 and slightly upstream of the respective intake valves (not shown). These fuel injection valves 6 are connected to a fuel pump (not shown), and electrically connected to the ECU 5. A valve opening period of each fuel injection valve 6 is controlled by a signal output from the ECU 5.

An absolute intake pressure (PBA) sensor 8 is provided immediately downstream of the throttle valve 3. An absolute pressure signal converted to an electrical signal by the absolute intake pressure sensor 8, is supplied to the ECU 5. An intake air temperature (TA) sensor 9 is provided downstream of the absolute intake pressure sensor 8 to detect an intake air temperature TA. An electrical signal corresponding to the detected intake air temperature TA, is outputted from the sensor 9 and supplied to the ECU 5.

An engine coolant temperature (TW) sensor 10 such as a thermistor is mounted on the body of the engine 1 to detect an engine coolant temperature (cooling water temperature) TW. A temperature signal corresponding to the detected engine coolant temperature TW is output from the sensor 10 and supplied to the ECU 5.

An engine rotational speed (NE) sensor 11 and a cylinder discrimination (CYL) sensor 12 are mounted in facing relation to a camshaft or a crankshaft (both not shown) of the engine 1. The engine rotational speed sensor 11 outputs a TDC signal pulse at a crank angle position located at a predetermined crank angle before the top dead center (TDC) corresponding to the start of an intake stroke of each cylinder of the engine 1 (at every 180° crank angle in the case of a four-cylinder engine). The cylinder discrimination sensor 12 outputs a cylinder discrimination signal pulse at a predetermined crank angle position for a specific cylinder of engine 1. These signal pulses output from the sensors 11 and 12 are supplied to the ECU 5.

An exhaust pipe 13 of the engine 1 is provided with a three-way catalyst 14 and a NOx removing device 15, as NOx removing means, arranged downstream of the three-way catalyst 14.

The three-way catalyst 14 has an oxygen storing capacity, and has the function of storing some of the oxygen contained in the exhaust gases in the exhaust lean condition where the air-fuel ratio of an air-fuel mixture to be supplied to the engine 1 is set in a lean region, with respect to the stoichiometric ratio, and the oxygen concentration in the exhaust gases is therefore relatively high. The three-way catalyst 14 also has the function of oxidizing HC and CO contained in the exhaust gases by using the stored oxygen in the exhaust rich condition where the air-fuel ratio of the air-fuel mixture to be supplied to the engine 1 is set in a rich region, with respect to the stoichiometric ratio, and the oxygen concentration in the exhaust gases is therefore low with a large proportion of HC and CO components.

The NOx removing device 15 includes a NOx absorbent for absorbing NOx and a catalyst for accelerating oxidation and reduction. The NOx removing device 15 absorbs NOx in the exhaust lean condition where the air-fuel ratio of the air-fuel mixture to be supplied to the engine 1 is set in a lean region with respect to the stoichiometric ratio. The NOx removing device 15 discharges the absorbed NOx in the exhaust rich condition, where the air-fuel ratio of the air-fuel mixture supplied to engine 1 is in the vicinity of the stoichiometric ratio or in a rich region with respect to the stoichiometric ratio, thereby reducing the discharged NOx into nitrogen gas by HC and CO and oxidizing the HC and CO into water vapor and carbon dioxide.

When the amount of NOx absorbed by the NOx absorbent reaches the limit of its NOx absorbing capacity, i.e., the maximum NOx absorbing amount, the NOx absorbent cannot absorb any more NOx. Accordingly, to discharge the absorbed NOx and reduce it, the air-fuel ratio is enriched, that is, reduction enrichment of the air-fuel ratio is performed.

A proportional type air-fuel ratio sensor (hereinafter referred to as "LAF sensor") 17 is mounted on the exhaust pipe 13 at a position upstream of the three-way catalyst 14. The LAF sensor 17 outputs an electrical signal substantially proportional to the oxygen concentration (air-fuel ratio) in the exhaust gases, and supplies the electrical signal to the ECU 5.

A binary type oxygen concentration sensor (hereinafter referred to as "O2 sensor") 18 is mounted on the exhaust pipe 13 at a position between the three-way catalyst 14 and the NOx removing device 15, and an O2 sensor 19 is mounted on the exhaust pipe 13 at a position downstream of the NOx removing device 15. Detection signals from sensors 18 and 19 are supplied to the ECU 5. Each of the O2 sensors 18 and 19 has a characteristic such that its output rapidly changes in the vicinity of the stoichiometric ratio. More specifically, each of the sensors 18 and 19 outputs a high level signal in a rich region with respect to the stoichiometric ratio, and outputs a low level signal in a lean region with respect to the stoichiometric ratio.

The engine 1 has a valve timing switching mechanism 30 capable of switching the valve timing of intake valves and exhaust valves between a high-speed valve timing suitable for a high-speed operating region of the engine 1 and a low-speed valve timing suitable for a low-speed operating region of the engine 1. This switching of the valve timing also includes switching of a valve lift amount. Further, when selecting the low-speed valve timing, one of the two intake valves in each cylinder is stopped to ensure stable combustion even in the case of setting the air-fuel ratio lean with respect to the stoichiometric ratio.

The valve timing switching mechanism 30 is of such a type that the switching of the valve timing is carried out hydraulically. That is, a solenoid valve for performing the hydraulic switching and an oil pressure sensor are connected to the ECU 5. A detection signal from the oil pressure sensor is supplied to the ECU 5, and the ECU 5 controls the solenoid valve to perform the switching control of the valve timing according to an operating condition of the engine 1.

An atmospheric pressure sensor 20 for detecting an atmospheric pressure PA is connected to the ECU 5, and a detection signal from the atmospheric pressure sensor 20 is supplied to the ECU 5.

The ECU 5 includes an input circuit 5a having various functions including a function of shaping the waveforms of input signals from the various sensors, a function of correcting the voltage levels of the input signals to a predetermined level, and a function of converting analog signal values into digital signal values, and a central processing unit (hereinafter referred to as "CPU") 5b. A memory circuit 5c consisting of a ROM (read only memory) preliminarily stores various operational programs to be executed by the CPU 5b, and a RAM (random access memory) for storing the results of computations or the like by the CPU 5b, and an output circuit 5d for supplying drive signals to the fuel injection valves 6.

The CPU 5b determines various engine operating conditions according to various engine operating parameter signals as mentioned above, and calculates a fuel injection period TOUT of each fuel injection valve 6 to be opened in synchronism with the TDC signal pulse, in accordance with Eq. (1) according to the above determined engine operating conditions.

$$TOUT = TIM \times KCMD \times KLAF \times KPA \times K1 + K2 \quad (1)$$

TIM is a basic fuel amount, more specifically, a basic fuel injection period of each fuel injection valve 6, and it is determined by retrieving a TI map set according to the engine rotational speed NE and the absolute intake pressure PBA. The TI map is set so that the air-fuel ratio of an air-fuel mixture to be supplied to the engine 1 becomes substantially equal to the stoichiometric ratio in an operating condition according to the engine rotational speed NE and the absolute intake pressure PBA. That is, the basic fuel amount TIM has a value substantially proportional to an intake air amount (mass flow) per unit time by the engine.

KCMD is a target air-fuel ratio coefficient, which is set according to engine operational parameters such as the engine rotational speed NE, the throttle valve opening THA, and the engine coolant temperature TW. The target air-fuel ratio coefficient KCMD is proportional to the reciprocal of an air-fuel ratio A/F, i.e., proportional to a fuel-air ratio F/A, and takes a value of 1.0 for the stoichiometric ratio, therefore, KCMD is referred to also as a target equivalent ratio. Further, in the case of executing reduction enrichment or determination of deterioration of the NOx removing device 15 to be hereinafter described, the target air-fuel ratio coefficient KCMD is set to a predetermined enrichment value KCMDRR or KCMDRM for enrichment of an air-fuel ratio.

KLAF is an air-fuel ratio correction coefficient calculated by PID (Proportional Integral Differential) control so that a detected equivalent ratio KACT calculated from a detected value from the LAF sensor 17 becomes equal to the target equivalent ratio KCMD, in the case that the conditions for execution of feedback control are satisfied.

KPA is an atmospheric pressure correction coefficient set according to the atmospheric pressure PA. When the atmospheric pressure PA is in the vicinity of 101.3 kPa, KPA is set to "1.0" (noncorrective value). When the atmospheric pressure PA decreases, KPA is set to a value greater than "1.0," thereby correcting the fuel supply amount in its increasing direction. As will be hereinafter described, the atmospheric pressure correction coefficient KPA is set so as to increase with a decrease in the atmospheric pressure PA, and the fuel supply amount is corrected so as to increase with a decrease in the atmospheric pressure PA.

K1 and K2 are respectively a correction coefficient and a correction variable computed according to various engine parameter signals. The correction coefficient K1 and correction variable K2 are predetermined values that optimize various characteristics such as fuel consumption characteristics and engine acceleration characteristics, according to engine operating conditions.

The CPU 5b supplies a drive signal for opening each fuel injection valve 6 according to the fuel injection period TOUT obtained above, through the output circuit 5d to the fuel injection valve 6.

Figure 2:
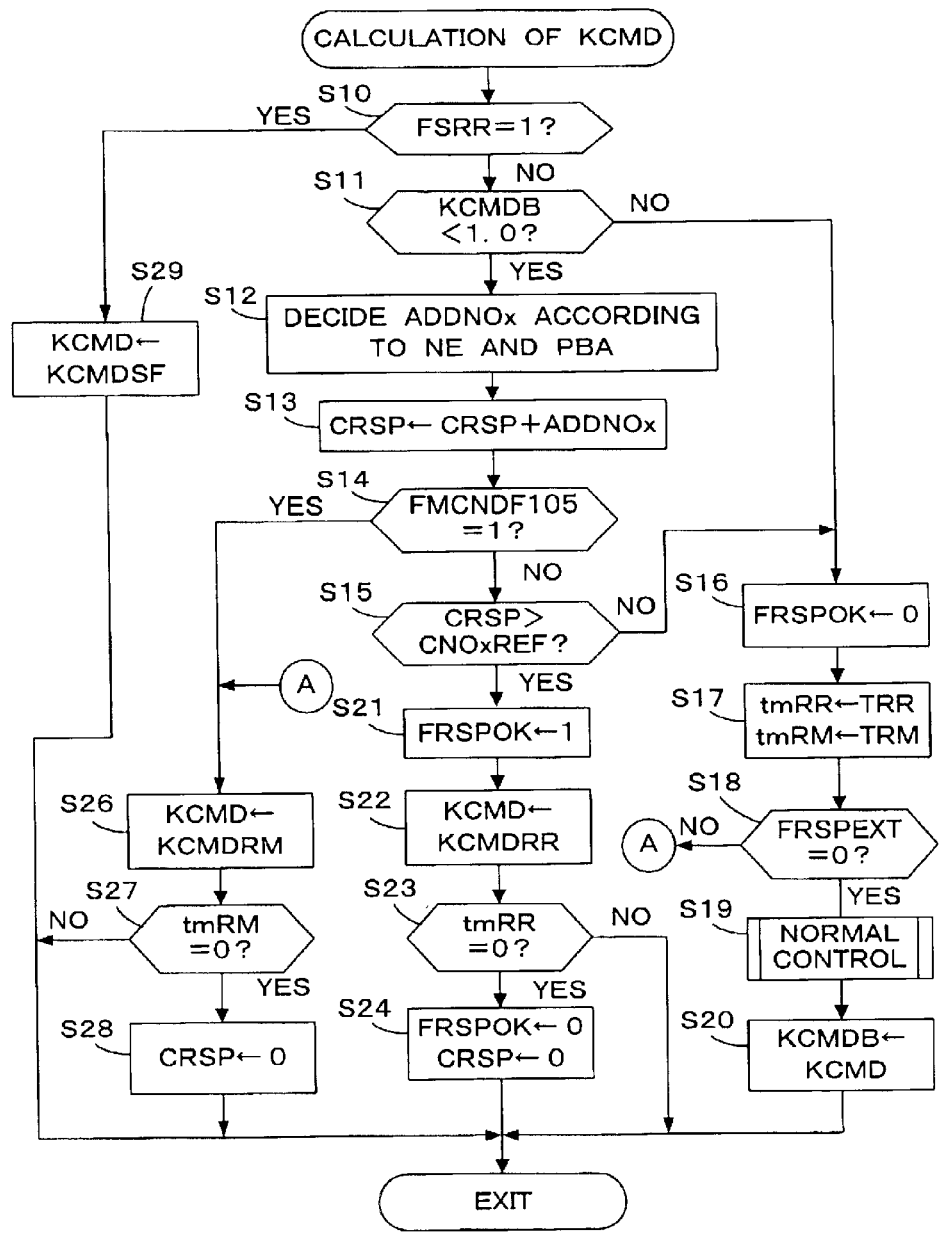
FIG. 2 is a flowchart showing a program for setting a target air-fuel ratio coefficient (KCMD)

FIG. 2 is a flowchart showing a program for calculating the target air-fuel ratio coefficient KCMD applied to Eq. (1) mentioned above. This program is executed by the CPU 5b at predetermined time intervals.

In step S10, it is determined whether or not a SOx removal enrichment flag FSRR set in the process, (SOx removal process) shown in FIG. 14 described below, is "1." When the SOx removal enrichment flag FSRR is set to "1," it indicates the execution of air-fuel ratio enrichment for removing SOx accumulated in the NOx removing device 15. If FSRR is "0" in step S10, the program proceeds to step S11. If FSRR is "1" in step S10, the target air-fuel ratio coefficient KCMD is set to a predetermined value KCMDSF (e.g., 1.03) for SOx removal enrichment (step S29).

In step S11, it is determined whether or not the engine 1 is in a lean operating condition, that is, whether or not a stored value KCMDB of the target air-fuel ratio coefficient KCMD stored in step S20 described below during normal control is less than "1.0." If KCMDB is greater than or equal to 1.0, that is, if the engine 1 is not in the lean operating condition, the program proceeds directly to step S16, in which a reduction enrichment flag FRSPOK is set to "0." The flag FRSPOK set to "1" indicates the duration of execution of reduction enrichment. Thereafter, a reduction enrichment time TRR (e.g., 5 to 10 sec) is set to a downcount timer tmRR, to be referred in step S23 described below, and a deterioration determination enrichment time TRM (>TRR), which is longer than the reduction enrichment time TRR, is set to a downcount timer tmRM, to be referred to in step S27 described below. Then, the timers tmRR and tmRM are started (step S17).

Thereafter, it is determined whether or not an enrichment continuation flag FRSPEXT is "0" (step S18). The enrichment continuation flag FRSPEXT is set by the process shown in FIG. 9 described below. The flag FRSPEXT set to "1" indicates the continuation of air-fuel ratio enrichment even after ending the deterioration determination for the NOx removing device 15. If FRSPEXT is "1," the program proceeds to step S26 described below, in which the air-fuel ratio enrichment is continued.

If FRSPEXT is "0" in step S18, normal control is performed to set the target air-fuel ratio coefficient KCMD according to engine operating conditions (step S19). Basically, the target air-fuel ratio coefficient KCMD is calculated according to the engine speed NE and the absolute intake pressure PBA. However, in the condition where the engine coolant temperature TW is low or in a predetermined high-load operating condition, the set value of the target air-fuel ratio coefficient is changed according to these conditions. Then, the target air-fuel ratio coefficient KCMD calculated in step S19 is stored as a stored value KCMDB (step S20), and this program ends. In an engine operating condition where the lean operation is allowed, the target air-fuel ratio coefficient KCMD is set to a value which is less than "1.0."

If KCMDB is less than "1.0" in step S11, that is, if the engine 1 is in the lean operating condition, an increment value ADDNOx to be used in step S13 is decided according to the engine speed NE and the absolute intake pressure PBA (step S12). The increment value ADDNOx is a parameter corresponding to the amount of NOx exhausted per unit time during the lean operation, and this parameter increases with an increase in the engine speed NE and with an increase in the absolute intake pressure PBA.

In step S13, the increment value ADDNOx decided in step S12 is applied to the following expression to increment a NOx amount counter CRSP, thereby obtaining a NOx exhaust amount, that is, a count value corresponding to the amount of NOx absorbed by the NOx absorbent, as shown in Eq. (2).

$$CRSP = CRSP + ADDNOx \qquad (2)$$

In step S14, it is determined whether or not an execution condition flag FMCNDF105 is "1." When the execution condition of deterioration determination of the NOx removing device 15 is satisfied, the execution condition flag FMCNDF105 is set to "1." Normally, FMCNDF105 is "0," so that the program proceeds to step S15. In step S15, it is determined whether or not the current value of the NOx amount counter CRSP has exceeded an allowable value CNOxREF. If the answer to step S15 is negative (NO), the program proceeds to step S16, in which the normal control is performed, that is, the target air-fuel ratio coefficient KCMD is set according to engine operating conditions unless the enrichment continuation flag FRSPEXT is set to "1." The allowable value CNOxREF is set to a value corresponding to an NOx amount slightly less than the maximum NOx absorption amount of the NOx absorbent, for example.

If CRSP is greater than CNOxREF in step S15, the reduction enrichment flag FRSPOK is set to "1" (step S21). Subsequently, the target air-fuel ratio coefficient KCMD is set to a predetermined enrichment value KCMDRR corresponding to a value equivalent to an air-fuel ratio of 14.0, thus executing reduction enrichment (step S22). Then, it is determined whether or not the current value of the timer tmRR is "0" (step S23). If tmRR is greater than "0," this program ends at once. If tmRR is "0," the reduction enrichment flag FRSPOK is set to "0" and the current value of the NOx amount counter CRSP is reset to "0" (step S24). Accordingly, the answer to step S15 becomes negative (NO), so that the normal control is then performed.

If the deterioration determination execution condition is satisfied (FMCNDF105 is "1"), the program proceeds from step S14 to step S26, in which the target air-fuel ratio coefficient KCMD is set to a predetermined deterioration determination enrichment value KCMDRM (<KCMDRR) corresponding to a value (e.g., air-fuel ratio of 14.3) slightly shifted to the lean region from a value equivalent to an air-fuel ratio of 14.0, thus executing deterioration determination enrichment (step S26). The reason for making the degree of enrichment smaller in the execution of deterioration determination than the degree of enrichment in the usual reduction enrichment is that if the degree of enrichment is large, the enrichment execution time is short, and improper determination is prone to occur at the time of deterioration determination of the NOx removing device 15. Accordingly, by reducing the degree of enrichment and increasing the enrichment execution time (=TRM), the accuracy of deterioration determination can be improved. Furthermore, by reducing the degree of enrichment, the outputs from the O2 sensors 18 and 19 become susceptible to SOx, thereby improving the accuracy of determining a condition of high SOx concentration.

Subsequently, it is determined whether or not the current value of the timer tmRM is "0" (step S27). If tmRM is greater than "0," this program ends at once. If tmRM is "0," the current value of the NOx amount counter CRSP is reset to "0" (step S28).

According to the process shown in FIG. 2, the reduction enrichment is executed intermittently in an engine operating condition where the lean operation is allowed (steps S22 and S23), so that NOx absorbed by the NOx absorbent in the NOx removing device 15 is suitably reduced. Further, when the deterioration determination execution condition for the NOx removing device 15 is satisfied, the deterioration determination enrichment is executed so that the degree of enrichment is made smaller than the degree of enrichment in the reduction enrichment and that the execution time period TRM is made longer than the execution time period of the reduction enrichment (steps S26 and S27). Further, in the case of executing the SOx removal (see FIG. 14), the SOx removal enrichment is executed (steps S10 and S29). Further, when the enrichment continuation flag FRSPEXT is set to "1" in the process shown in FIG. 9 (step S123) described below, the target air-fuel ratio coefficient KCMD is maintained at the predetermined enrichment value KCMDRM even after termination of the deterioration determination for the NOx removing device 15, to continue the air-fuel ratio enrichment (steps S18 and S26).

Figure 3:
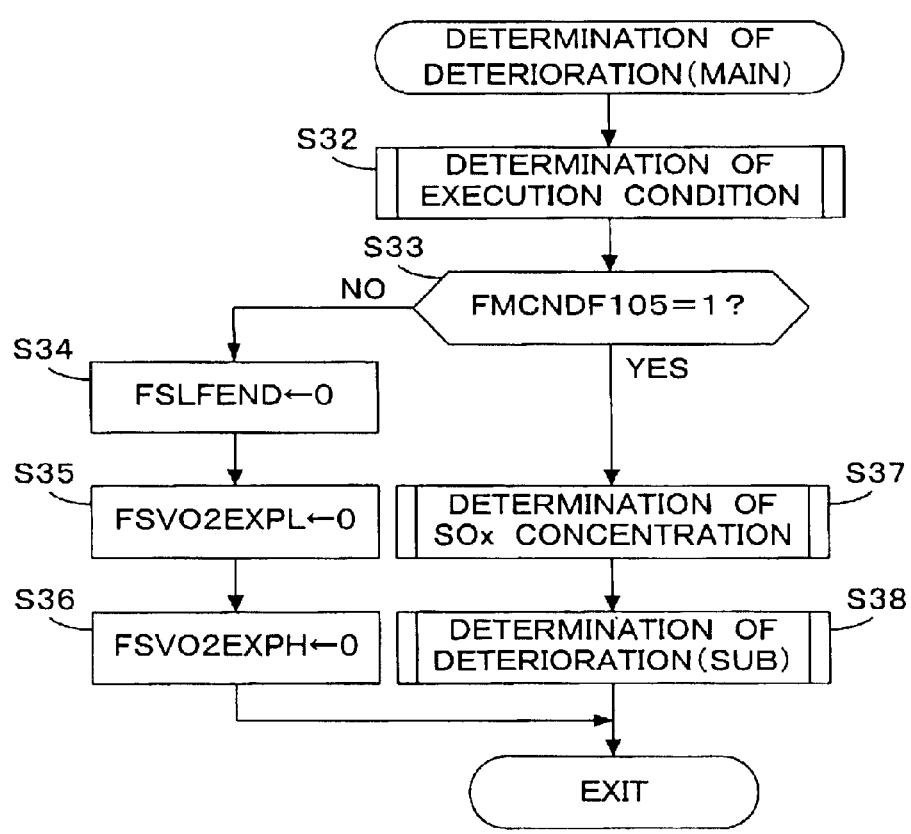
FIG. 3 is a flowchart showing a main routine for executing deterioration determination for a NOx removing device.

FIG. 3 is a flowchart showing a main routine of the deterioration determination process for the NOx removing device 15. This process is executed by the CPU 5b in synchronism with the generation of a TDC signal pulse.

Figure 4:
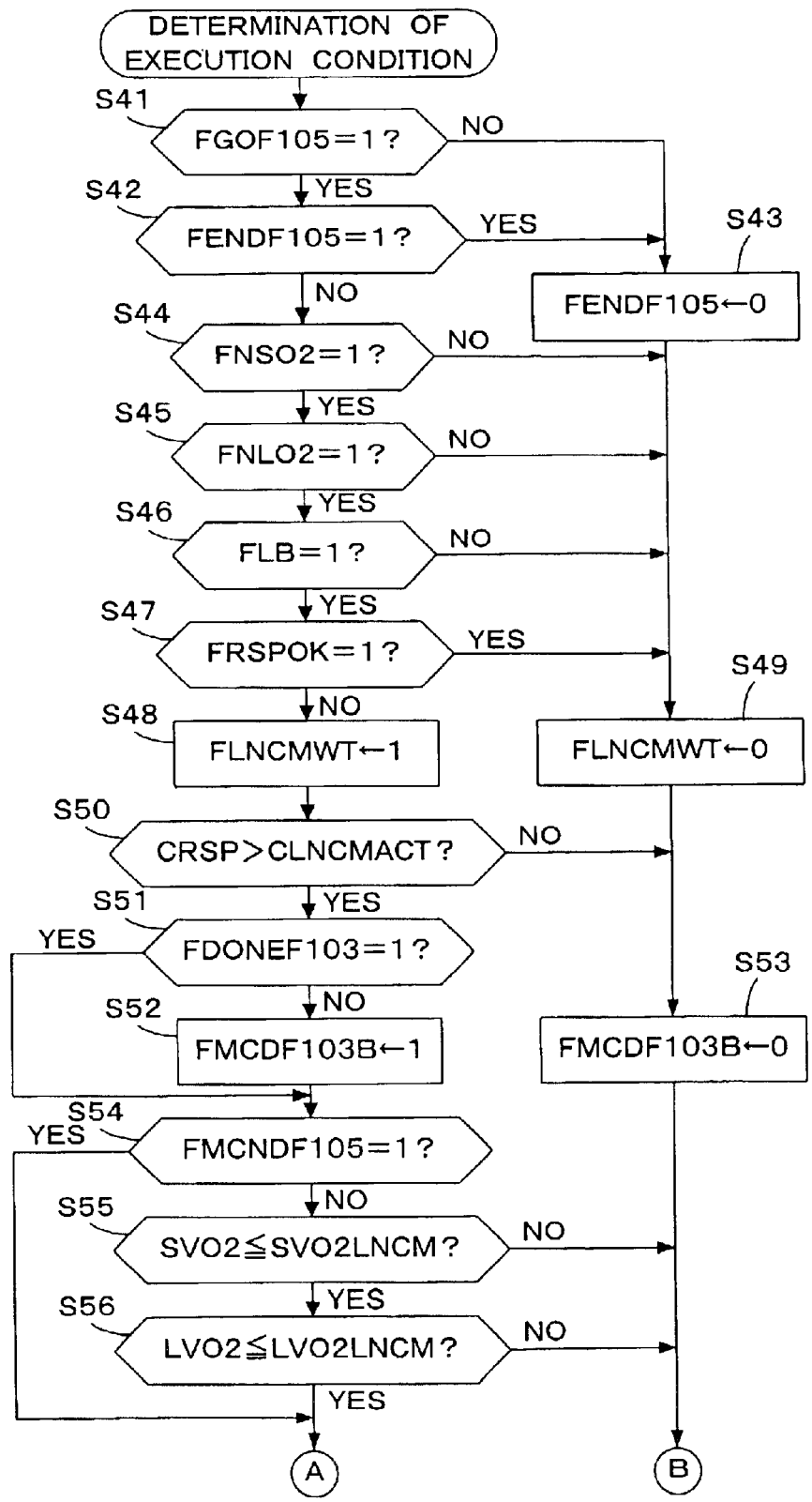
FIG. 4 is a flowchart showing a program for determining execution conditions of the deterioration determination.
Figure 5:
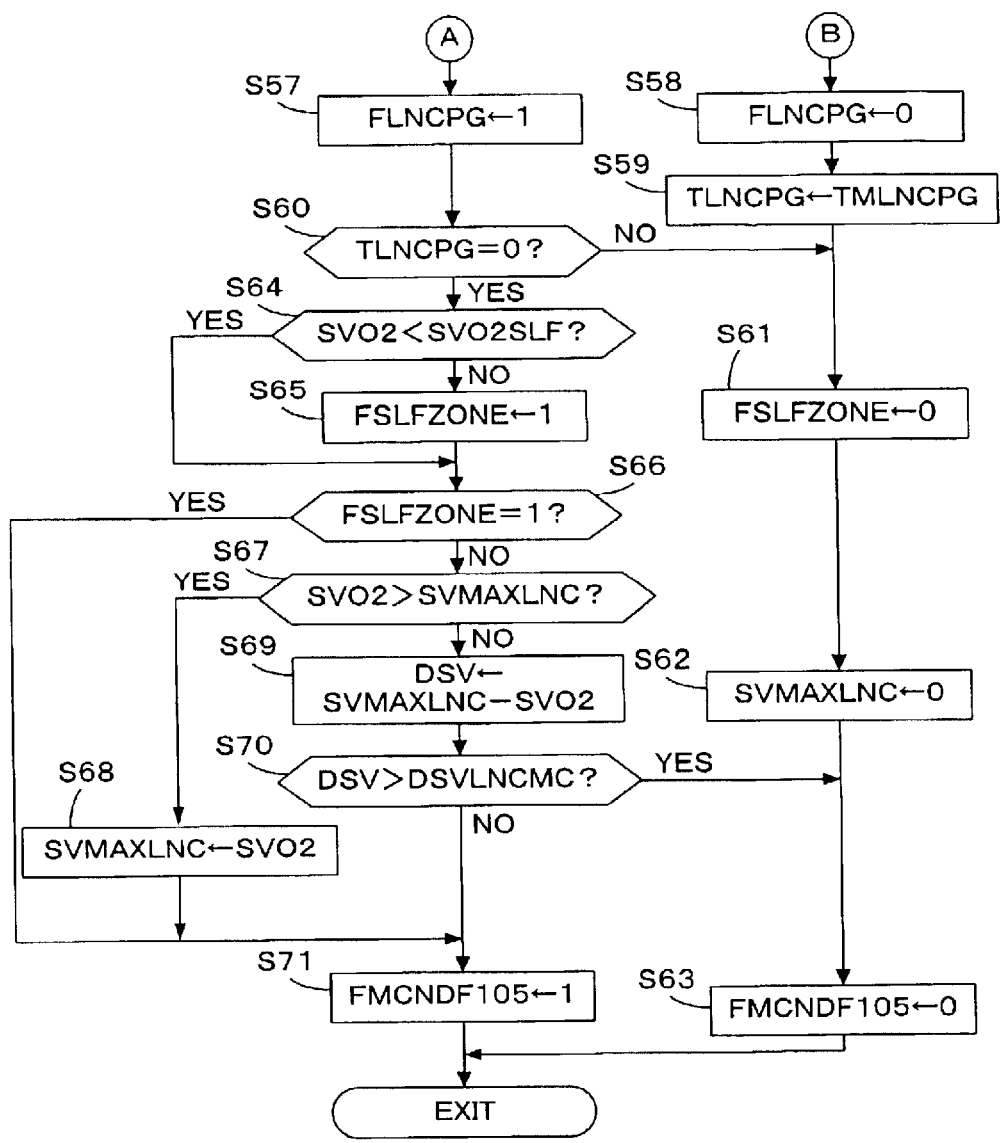
FIG. 5 is a flowchart showing a program for determining execution conditions of the deterioration determination.

In step S32, the execution condition determination process shown in FIGS. 4 and 5 is executed. In the execution condition determination process, it is determined whether or not the execution condition of deterioration determination for the NOx removing device 15 is satisfied. If the execution condition is satisfied, the execution condition flag FMCNDF105 is set to "1." In step S33, it is determined whether or not the execution condition flag FMCNDF105 is "1." If FMCNDF105 is "0," which indicates that the execution condition is not satisfied, a SOx concentration determination end flag FSLFEND, a first reference over flag FSVO2EXPL, and a second reference over flag FSVO2EXPH are all set to "0" (steps S34, S35, and S36), and this process ends.

Figure 6:
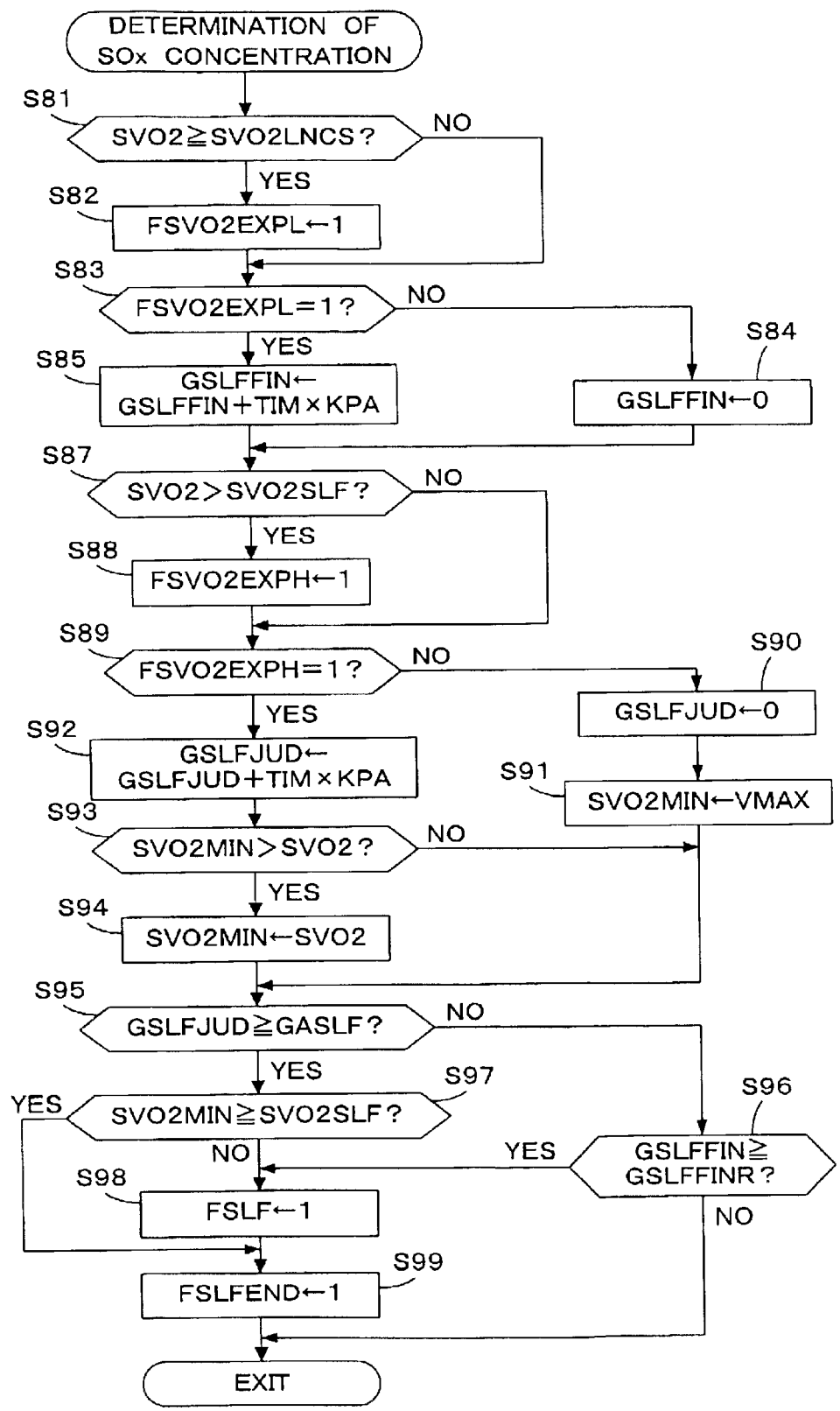
FIG. 6 is a flowchart showing a program for determining a SOx concentration.

The SOx concentration determination end flag FSLFEND is set to "1" when the SOx concentration determination process shown in FIG. 6 ends. The first reference over flag FSVO2EXPL is set to "1" when the upstream O2 sensor output SVO2 has reached a first upstream reference value SVO2LNCS (e.g., 0.3 V) (step S82 in FIG. 6). The second reference over flag FSVO2EXPH is set to "1" when the upstream O2 sensor output SVO2 has exceeded a second upstream reference value SVO2SLF (e.g., 0.7 V) which is higher than the first upstream reference value SVO2LNCS (step S88 in FIG. 6).

Figure 8:
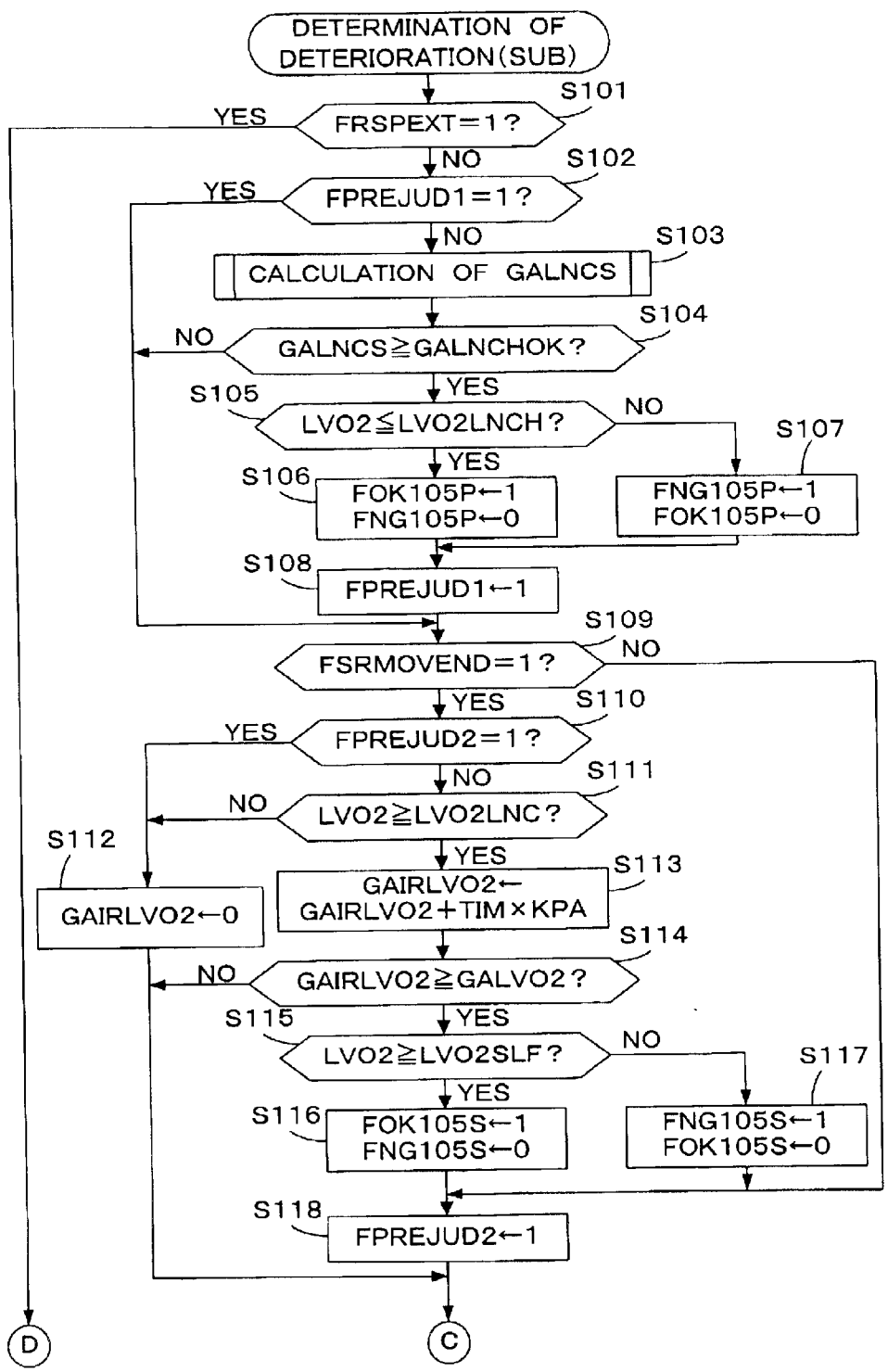
FIG. 8 is a flowchart showing a subroutine for executing the deterioration determination for the NOx removing device.
Figure 9:
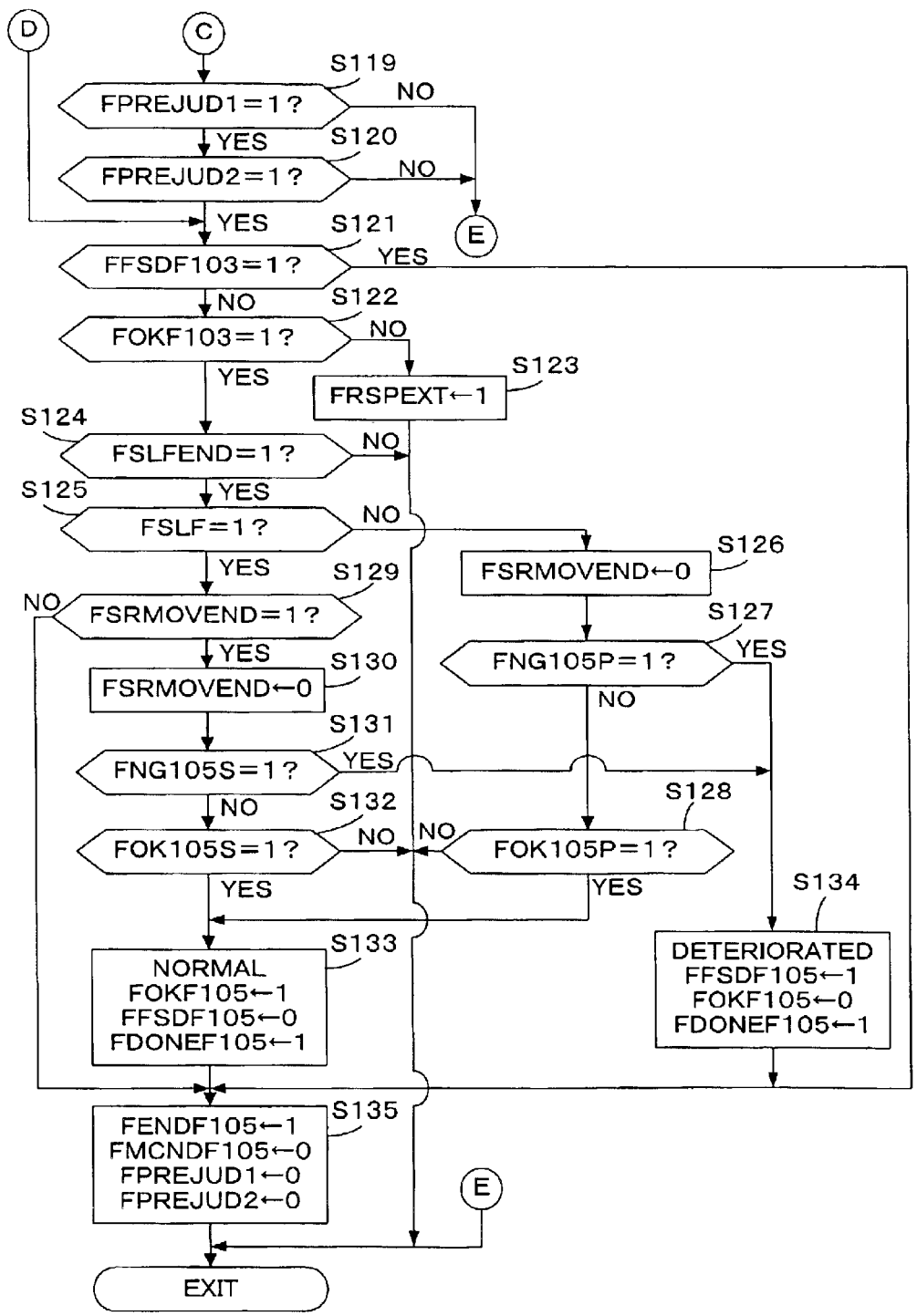
FIG. 9 is a flowchart showing a subroutine for executing the deterioration determination for the NOx removing device.
Figure 10:
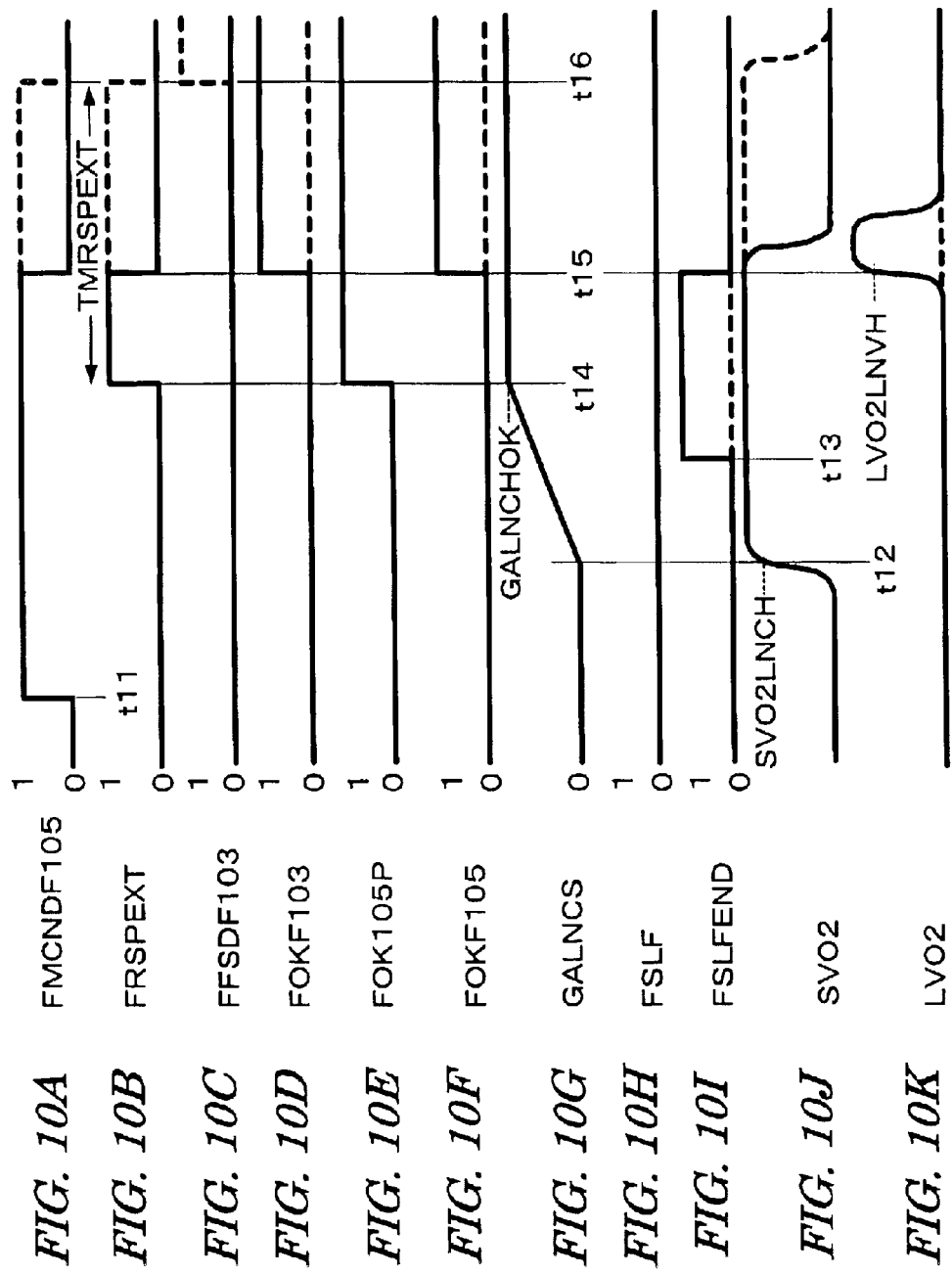
FIGS. 10A to 10K are time charts for illustrating the process of FIGS. 8 and 9.

If the execution condition flag FMCNDF105 is "1" in step S33, which indicates that the execution condition is satisfied, the SOx concentration determination process shown in FIG. 6 is executed (step S37), and the deterioration determination subroutine shown in FIGS. 8 and 9 is next executed (step S38).

FIGS. 4 and 5 are flowcharts of the execution condition determination process executed in step S32 shown in FIG. 3.

In step S41, it is determined whether or not a deterioration determination command flag FGOF105 is "1." It is sufficient that the deterioration determination of the NOx removing device 15 is to be executed once in one operational period (a period from engine starting to stopping). Therefore, the deterioration determination command flag FGOF105 is set to "1" at the time the engine operating condition becomes stable, after starting of the engine. If the deterioration determination command flag FGOF105 is set to "1," it is determined whether or not a deterioration determination end flag FENDF105 is "1" (step S42).

If the answer to step S41 is negative (NO) or the answer to step S42 is affirmative (YES), the deterioration determination end flag FENDF105 is set to "0" (step S43), and the program proceeds to step S49.

If the answer to step S42 is negative (NO), it is determined whether or not an upstream O2 sensor activation flag FNSO2 is "1" (step S44). The flag FNSO2 set to "1" indicates that the upstream O2 sensor 18 has been activated. If the answer to step S44 is affirmative (YES), it is determined whether or not a downstream O2 sensor activation flag FNLO2 is "1" (step S45). The flag FNLO2 set to "1" indicates that the downstream O2 sensor 19 has been activated.

If the answer to step S45 is affirmative (YES), it is determined whether or not a lean operation flag FLB is "1" (step S46). The lean operation flag FLB set to "1" indicates that the lean operation in which the air-fuel ratio is set leaner than the stoichiometric ratio is allowed (the engine is in an operating condition where the lean operation can be performed). If the answer to step S46 is affirmative (YES), it is determined whether or not the reduction enrichment flag FRSPOK is "1" (step S47).

If the answer to any one of steps S44 to S46 is negative (NO) or the answer to step S47 is affirmative (YES), a precondition flag FLNCMWT is set to "0" (step S49). After executing step S49, the program proceeds to step S53.

On the other hand, if the answers to all of steps S44 to S46 are affirmative (YES) and the answer to step S47 is negative (NO), that is, if the activation of the O2 sensors 18 and 19 has been completed, the lean operation is allowed and the air-fuel ratio reduction enrichment is not executed, and the precondition flag FLNCMWT is set to "1" (step S48).

In step S50, it is determined whether or not the value of the NOx amount counter CRSP is greater than a deterioration determination allowance value CLNCMACT. The deterioration determination allowance value CLNCMACT is set to a value less than or equal to the allowable value CNOxREF used in the process shown in FIG. 2. If CRSP is less than or equal to CLNCMACT in step S50, the program proceeds to step S53, in which a failure determination condition flag FMCDF103B is set to "0". The failure determination condition flag FMCDF103B set to "1" indicates that the execution condition of failure determination process (not shown) for the downstream O2 sensor 19 is satisfied.

If CRSP is greater than CLNCMACT in step S50, which indicates that NOx has been absorbed in the NOx removing device 15 by an amount which is enough to execute the deterioration determination of the NOx removing device 15, it is determined whether or not an O2 sensor failure determination end flag FDONEF103 is "1" (step S51). If FDONEF103 is "1," which indicates that the failure determination for the O2 sensor 19 has ended, the program proceeds directly to step S54. If FDONEF103 is "0," the failure determination condition flag FMCDF103B is set to "1" (step S52), and the program proceeds to step S54.

In step S54, it is determined whether or not the execution condition flag FMCNDF105 has already been set to "1." If FMCNDF105 is "1," the program proceeds directly to step S57. If FMCNDF105 is "0," it is determined whether or not the upstream O2 sensor output SVO2 is less than or equal to a third upstream reference value SVO2LNCM (e.g., 0.1 V), which is less than the above-mentioned first upstream reference value SVO2LNCS (step S55). If SVO2 is less than or equal to SVO2LNCM, it is determined whether or not the downstream O2 sensor output LVO2 is less than or equal to a first downstream reference value LVO2LNCM, which is set to a value substantially equal to the third upstream reference value SVO2LNCM (step S56). Steps S55 and S56 are executed to check that each of the O2 sensor outputs SVO2 and LVO2, before execution of the deterioration determination enrichment, is a value indicative of an exhaust lean condition (a condition where the oxygen concentration in the exhaust gases is relatively high).

As the result, if the answer to step S55 or S56 is negative (NO), a purge cut flag FLNCPG is set to "0" (step S58), and a downcount timer TLNCPG is set to a predetermined time TMLNCPG (e.g., 2 seconds) and started (step S59). Thereafter, a rich zone flag FSLFZONE is set to "0" (step S61), a maximum value parameter SVMAXLNC is set to "0" (step S62), and the execution condition flag FMCNDF105 is set to "0" (step S63). Then, this program ends.

The purge cut flag FLNCPG set to "1" indicates that the evaporative fuel purge for supplying evaporative fuel generated in the fuel tank to the intake pipe 2 is inhibited. The rich zone flag FSLFZONE is set to "1" when the upstream O2 sensor output SVO2 becomes greater than or equal to the second upstream reference value SVO2SLF (see steps S64 and S65). The maximum value parameter SVMAXLNC is a parameter indicative of a maximum value before the upstream O2 sensor output SVO2 reaches the second upstream reference value SVO2SLF (see steps S66 to S68).

If the answers to both of steps S55 and S56 are affirmative (YES), which indicates that both of the upstream O2 sensor output SVO2 and the downstream O2 sensor output LVO2 indicate the exhaust lean condition, the purge cut flag FLNCPG is set to "1" (step S57). Thereafter, it is determined whether or not the value of the timer TLNCPG started in step S59 is "0" (step S60). If TLNCPG is greater than "0," the program proceeds to step S61.

When the value of the timer TLNCPG becomes "0," the program proceeds from step S60 to step S64, in which it is determined whether or not the upstream O2 sensor output SVO2 is less than the second upstream reference value SVO2SLF. Initially, the answer to step S64 is affirmative (YES), so that the program skips step S65 to go to step S66, in which it is determined whether or not the rich zone flag FSLFZONE is "1." Initially, the answer to step S66 is negative (NO), so that the program proceeds to step S67, in which it is determined whether or not the upstream O2 sensor output SVO2 is greater than the maximum value parameter SVMAXLNC. Since the maximum value parameter SVMAXLNC is initialized to "0" in step S62, the answer to step S67 is initially affirmative (YES). Then, the maximum value parameter SVMAXLNC is set to a current value of the O2 sensor output SVO2 (step S68), and the program proceeds to step S71. In step S71, the execution condition flag FMCNDF105 is set to "1."

Figure 7A:
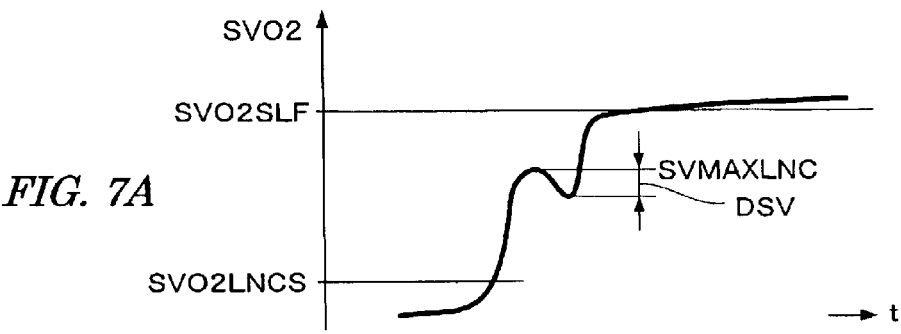
FIGS. 7A to 7C are time charts for illustrating the process of FIGS. 4 and 5 and the process of FIG. 6.

When the O2 sensor output SVO2 increases monotonically, the answer to step S67 is always affirmative (YES). However, when there is a case that the O2 sensor output SVO2 temporarily decreases as shown in FIG. 7A, the answer to step S67 becomes negative (NO) and the program proceeds to step S69. In step S69, a difference DSV between the maximum value parameter SVMAXLNC and the O2 sensor output SVO2 is calculated from the following equation Eq. (3):

$$DSV = SVMAXLNC - SVO2 \quad (3)$$

It is then determined whether or not the difference DSV is greater than a predetermined difference DSVLNCMC (step S70). If the difference DSV exceeds the predetermined difference DSVLNCMC, the program proceeds to step S63, in which the execution condition flag FMCNDF105 is set to "0".

In the above case, when the difference DSV exceeds the predetermined difference DSVLNCMC, it is considered that the exhaust lean condition has been temporarily produced because of engine acceleration or the like. If the deterioration determination is continued in this case, there is a possibility of improper determination. Therefore, it is decided that the execution condition is not satisfied in this case to suspend the deterioration determination.

If the answer to step S70 does not become affirmative (YES), but the O2 sensor output SVO2 reaches the second upstream reference value SVO2SLF, the rich zone flag FSLFZONE is set to "1" (step S65), and the program proceeds from step S66 directly to step S71.

According to the process of FIGS. 4 and 5, the execution condition of deterioration determination for the NOx removing device 15 is basically satisfied when the precondition flag FLNCMWT is set to "1." However, when the exhaust condition either in the vicinity of the upstream O2 sensor or in the vicinity of the downstream O2 sensor is not the exhaust lean condition (steps S55 and S56), the execution condition is not satisfied. Further, during the predetermined time period TMLNCPG from the time of inhibition of the evaporative fuel purge, the execution condition is not satisfied (steps S57 and S60). Further, when the temporary decrease (DSV) of the upstream O2 sensor output SVO2 becomes greater than the predetermined difference DSVLNCMC in the condition where the upstream O2 sensor output SVO2 is lower than the second upstream reference value SVO2SLF (when the answer to step S70 is affirmative (YES)), the execution condition is not satisfied.

FIG. 6 is a flowchart of the SOx concentration determination process executed in step S37 shown in FIG. 3.

In step S81, it is determined whether or not the upstream O2 sensor output SVO2 is greater than or equal to the first upstream reference value SVO2LNCS. Initially, SVO2 is less than SVO2LNCS, so that the program skips step S82 to go to step S83. In step S83, it is determined whether or not the first reference over flag FSVO2 EXPL, which is set to "1" in step S82, is "1." Initially, the answer to step S83 is negative (NO), so that a first exhaust amount parameter GSLFFIN is set to "0" (step S84), and the program proceeds to step S87.

In step S87, it is determined whether or not the O2 sensor output SVO2 has exceeded the second upstream reference value SVO2SLF. Initially, the answer to step S87 is negative (NO), so that the program skips step S88 to go to step S89. In step S89, it is determined whether or not the second reference over flag FSVO2EXPH, which is set to "1" in step S88, is "1." Initially, the answer to step S89 is negative (NO), so that a second exhaust amount parameter GSLFJUD is set to "0" (step S90), and a minimum value parameter SVO2 MIN is set to a maximum value VMAX (e.g., in the case that one byte is allocated to the minimum value parameter SVO2MIN, a hexadecimal FF is set as the maximum value VMAX) (step S91). Thereafter, the program proceeds to step S95.

In step S95, it is determined whether or not the second exhaust amount parameter GSLFJUD is greater than or equal to a second determination threshold GASLF. Initially, the answer to step S95 is negative (NO), so that it is determined whether or not the first exhaust amount parameter GSLFFIN is greater than or equal to a first determination threshold GSLFFINR (step S96). Initially, the answer to step S96 is also negative (NO), so that this process ends.

When the O2 sensor output SVO2 reaches the first upstream reference value SVO2LNCS, the first reference over flag FSVO2EXPL is set to "1" (step S82), and the program proceeds from step S83 to step S85. In step S85, the first exhaust amount parameter GSLFFIN is calculated from Eq. (4) shown below.

$$GSLFFIN = GSLFFIN + (TIM \times KPA) \quad (4)$$

In the Eq. (4), GSLFFIN on the right side is a value calculated in the preceding execution of this process. TIM and KPA are the basic fuel amount and the atmospheric pressure correction coefficient shown in Eq. (1), respectively. TIM is a basic fuel amount, that is, a fuel amount set so that the air-fuel ratio becomes the stoichiometric ratio according to engine operating conditions (engine speed NE and absolute intake pressure PBA). Accordingly, TIM is a parameter which is proportional to an intake air amount per unit time of the engine 1. In other words, TIM is a parameter which is proportional to an amount of exhaust gases per unit time of the engine 1. Thus, the first exhaust amount parameter GSLFFIN, corresponding to an accumulated value of the amount of exhaust gases flowing into the NOx removing device 15 from the time the upstream O2 sensor output SVO2 has reached the first upstream reference value SVO2LNCS, is obtained by the calculation of Eq. (4).

During the execution of the deterioration determination, the air-fuel ratio is maintained at a fixed rich air-fuel ratio (a value corresponding to KCMDRM) in a rich region with respect to the stoichiometric ratio. Therefore, the exhaust amount parameter GSLFFIN has a value proportional to an integrated value of the amounts of reducing components (HC and CO) contained in the exhaust gases. Further, the exhaust amount parameter GSLFFIN is proportional to the time elapsed from the time of starting the integration if the engine operating condition is substantially constant. These points apply similarly to the other exhaust amount parameters described below.

If the O2 sensor output SVO2 falls between the first upstream reference value SVO2LNCS and the second upstream reference value SVO2SLF, the program proceeds from step S87 through steps S89, S90, S91, and S95 to step S96. If the first exhaust amount parameter GSLFFIN is less than the first determination threshold GSLFFINR, this process ends. If the first exhaust amount parameter GSLFFIN reaches the first determination threshold GSLFFINR, a high concentration flag FSLF is set to "1" (step S98), and the program proceeds to step S99.

Figure 7B:
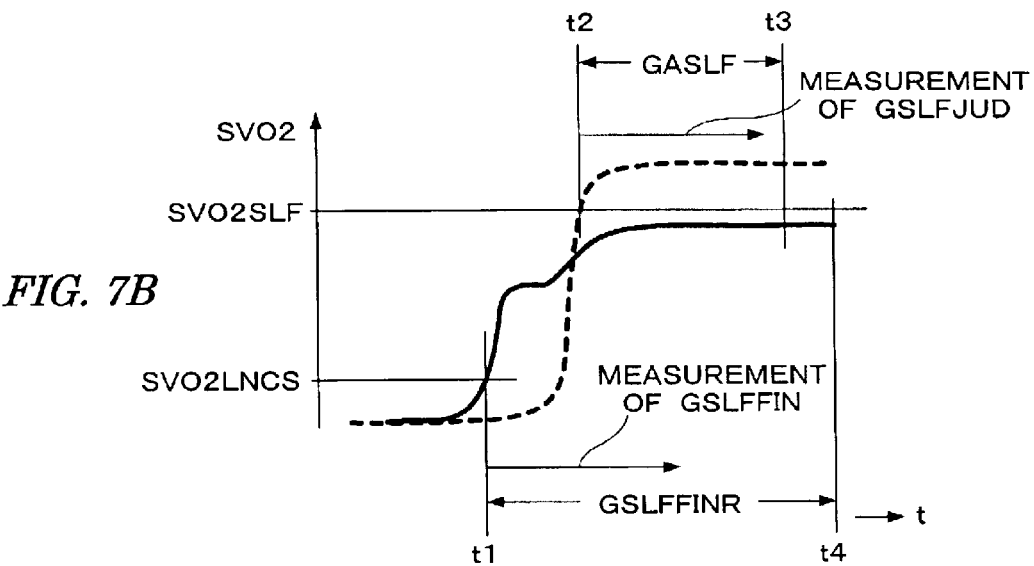

When the O2 sensor output SVO2 is less than the second upstream reference value SVO2SLF, at the time the first exhaust amount parameter GSLFFIN has reached the first determination threshold GSLFFINR, as shown by the solid line in FIG. 7B, it is determined that the SOx concentration in the vicinity of the O2 sensor 18 is high.

When the SOx concentration is high, there are two cases. A first case is that the time period until the O2 sensor output SVO2 reaches the second upstream reference value SVO2SLF is long. A second case is that the O2 sensor output SVO2 stays at a value lower than the second upstream reference value SVO2SLF. According to steps S85 and S96, the high SOx concentration can be determined in both the first and second cases mentioned above.

If SVO2 is greater than SVO2SLF in step S87, the second reference over flag FSVO2EXPH is set to "1" (step S88), and the program proceeds from step S89 to step S92. In step S92, the second exhaust amount parameter GSLFJUD is calculated from Eq. (5) shown below.

$$GSLFJUD=GSLFJUD+(TIM \times KPA) \quad (5)$$

Eq. (5) is obtained by substituting GSLFJUD for GSLF-FIN in Eq. (4). The second exhaust amount parameter GSLFJUD, which corresponds to an accumulated value of the amount of exhaust gases flowing into the NOx removing device 15 from the time the upstream O2 sensor output SVO2 has exceeded the second upstream reference value SVO2LNCS, is obtained by the calculation of Eq. (5) (see FIG. 7B).

In step S93, it is determined whether or not the minimum value parameter SVO2MIN is greater than the O2 sensor output SVO2. Initially, SVO2MIN is greater than SVO2. Accordingly, the minimum value parameter SVO2MIN is set to a current value of the O2 sensor output SVO2 (step S94), and the program proceeds to step S95. According to steps S93 and S94, the minimum value of the O2 sensor output SVO2, after setting the second reference over flag FSVO2EXPH to "1," is calculated as the minimum value parameter SVO2MIN.

Until the second exhaust amount parameter GSLFJUD reaches the second determination threshold GASLF, the program proceeds to step S96.

Figure 7C:
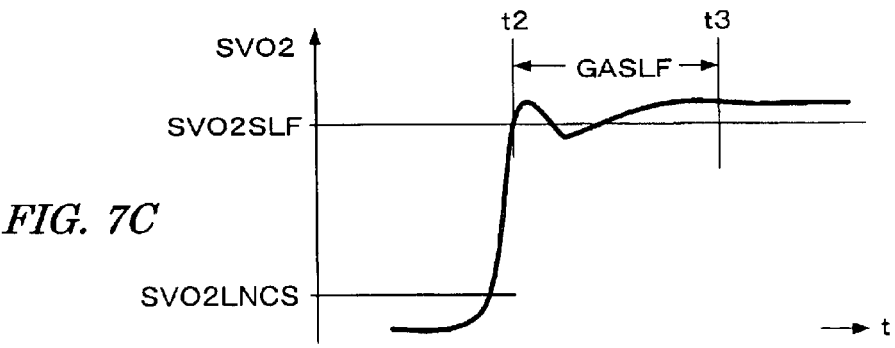

If the second exhaust amount parameter GSLFJUD reaches the second determination threshold GASLF, the program proceeds from step S95 to step S97, in which it is determined whether or not the minimum value parameter SVO2MIN is greater than or equal to the second upstream reference value SVO2SLF. If SVO2MIN is greater than or equal to SVO2SLF, the concentration determination end flag FSLFEND is set to "1" (step S99), and this process ends. If SVO2MIN is less than SVO2SLF, that is, if the O2 sensor output SVO2 exceeds the second upstream reference value SVO2SLF, and thereafter becomes lower than the second upstream reference value SVO2SLF as shown in FIG. 7C, it is indicated that the saturated output from the O2 sensor 18 tends to decrease. Accordingly, the high concentration flag FSLF is set to "1" (step S98).

According to the process of FIG. 6, it is determined that the SOx concentration is high when the O2 sensor output SVO2 changes, as shown by the solid line in FIG. 7B, or changes as shown in FIG. 7C. When the SOx concentration is high in the vicinity of the O2 sensor, it has been experimentally confirmed that the saturated output from the O2 sensor tends to decrease. By detecting this tendency in the process of FIG. 6, the condition where the SOx concentration is high can be detected. The high SOx concentration condition specifically corresponds to a condition where the SOx concentration is about 600 PPM or more. In such a condition, the oxygen concentration sensor output changes under the influence of SOx.

Further, when the three-way catalyst is deteriorated, the SOx concentration on the downstream side of the three-way catalyst tends to increase. Accordingly, when the NOx removing device is located on the downstream side of the three-way catalyst, as in this preferred embodiment, the SOx concentration on the downstream side of the three-way catalyst increases due to the deterioration of the three-way catalyst, causing a change in the oxygen concentration sensor output. As a result, the accuracy of deterioration determination of the NOx removing device is reduced. To cope with this problem, the deterioration determination for the NOx removing device is suspended when the SOx concentration is high as will be hereinafter described, which makes it possible to prevent improper determination.

The tendency that the saturated output from the O2 sensor decreases appears more remarkably when the degree of the air-fuel ratio enrichment is lower. Accordingly, the target air-fuel ratio coefficient KCMD in the deterioration determination is set to the deterioration determination enrichment predetermined value KCMDRM corresponding to an air-fuel ratio (e.g., about 14.3), which is slightly richer than the stoichiometric ratio in this preferred embodiment.

FIGS. 8 and 9 are flowcharts showing the deterioration determination subroutine executed in step S38 shown in FIG. 3.

In step S101, it is determined whether or not the enrichment continuation flag FRSPEXT is "1." If FRSPEXT is "1," the program proceeds directly to step S121. If FRSPEXT is "0," it is determined whether or not a first prejudgment flag FPREJUD1 is "1" (step S102). Initially, the first prejudgment flag FPREJUD1 is "0," since the flag FPREJUD1 is set to "1" in step S108. Accordingly, the program proceeds from step S102 to step S103, in which GALNCS calculation process shown in FIG. 11 is executed.

Figure 11:
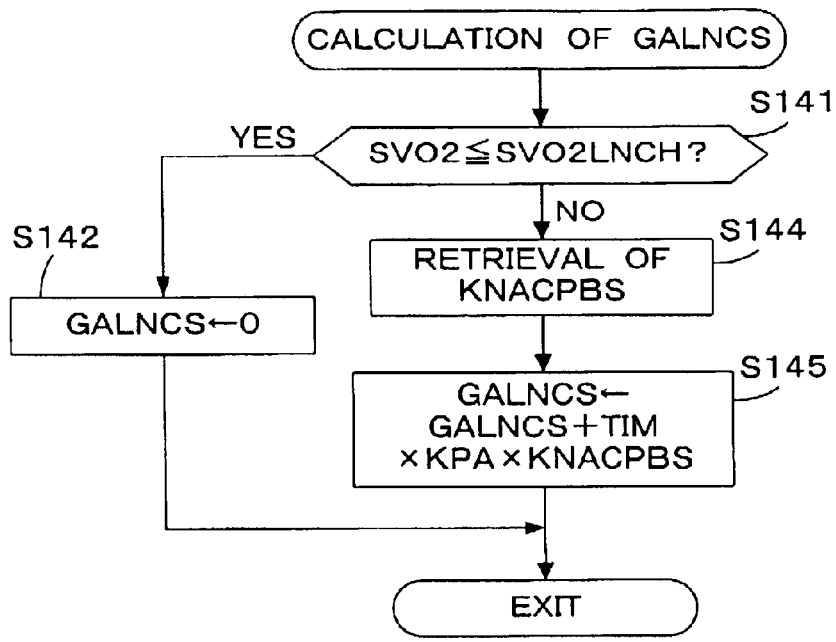
FIG. 11 is a flowchart showing a program for calculating an exhaust amount parameter (GALNCS) in the process of FIG. 8.

In step S141 shown in FIG. 11, it is determined whether or not the upstream O2 sensor output SVO2 is less than or equal to a fourth upstream reference value SVO2LNCH (e.g., 0.6 V). If SVO2 is less than or equal to SVO2LNCH, a third exhaust amount parameter GALNCS is set to "0" (step S142), and the process of FIG. 11 ends.

Figure 12:
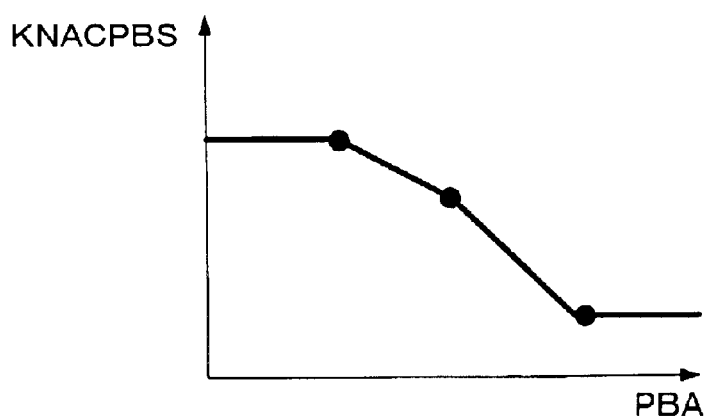
FIG. 12 is a graph showing a table used in the process of FIG. 11.

If the O2 sensor output SVO2 exceeds the fourth upstream reference value SVO2LNCH (see the solid line L1 in FIG. 13), KNACPBS shown in FIG. 12 is retrieved according to the absolute intake pressure PBA to calculate an intake pressure correction coefficient KNACPBS (step S144). KNACPBS is set so that the intake pressure correction coefficient KNACPBS decreases with an increase in the absolute intake pressure PBA.

In step S145, the third exhaust amount parameter GALNCS is calculated from Eq. (6) shown below.

$$GALNCS=GALNCS+(TIM \times KPA \times KNACPBS) \quad (6)$$

Eq. (6) is different from Eq. (5) in the point that the second term on the right side is multiplied by the intake pressure correction coefficient KNACPBS. It has been experimentally confirmed that the exhaust amount during the time period between adjacent TDC signal pulses decreases with an increase in the absolute intake pressure PBA. For the purpose of correcting this point, the intake pressure correction coefficient KNACPBS is introduced.

By the calculation of Eq. (6), the third exhaust amount parameter GALNCS, which corresponds to an accumulated value of the amount of exhaust gases flowing into the NOx removing device 15 from the time (t12 shown in FIG. 13) the upstream O2 sensor output SVO2 has exceeded the fourth upstream reference value SVO2LNCH, is obtained.

Referring back to FIG. 8, in step S104, it is determined whether or not the third exhaust amount parameter GALNCS calculated in step S103 is greater than or equal to a third determination threshold GALNCHOK. If GALNCS is less than GALNCHOK, the program proceeds directly to step S109. If GALNCS is greater than or equal to GALNCHOK (time t14 in FIG. 13), it is determined whether or not the downstream O2 sensor output LVO2 is less than or equal to a second downstream reference value LVO2LNCH (e.g., 0.7 V) (step S105).

Figure 13:
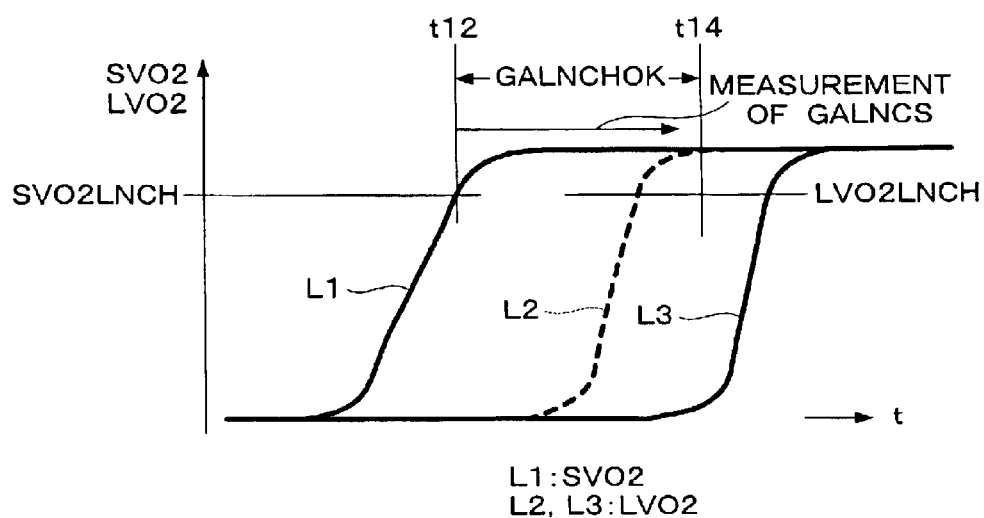
FIG. 13 is a time chart for illustrating the deterioration determination for the NOx removing device.

If LVO2 is less than or equal to LVO2LNCH, as shown by the solid line L3 in FIG. 13, it is determined that the NOx removing device 15 is normal. Then, a first prejudgment OK flag FOK105P is set to "1" and a first prejudgment NG flag FNG105P is set to "0" (step S106). Thereafter, the program proceeds to step S108. On the other hand, if LVO2 is greater than LVO2LNCH, as shown by the broken line L2 in FIG. 13, it is determined that the NOx removing device 15 is deteriorated. Then, the first prejudgment NG flag FNG105P is set to "1" and the first prejudgment OK flag FOK105P is set to "0" (step S107). Thereafter, the program proceeds to step S108.

In step S108, the first prejudgment flag FPREJUD1 is set to "1," so as to indicate that the first prejudgment has been completed.

Figure 14:
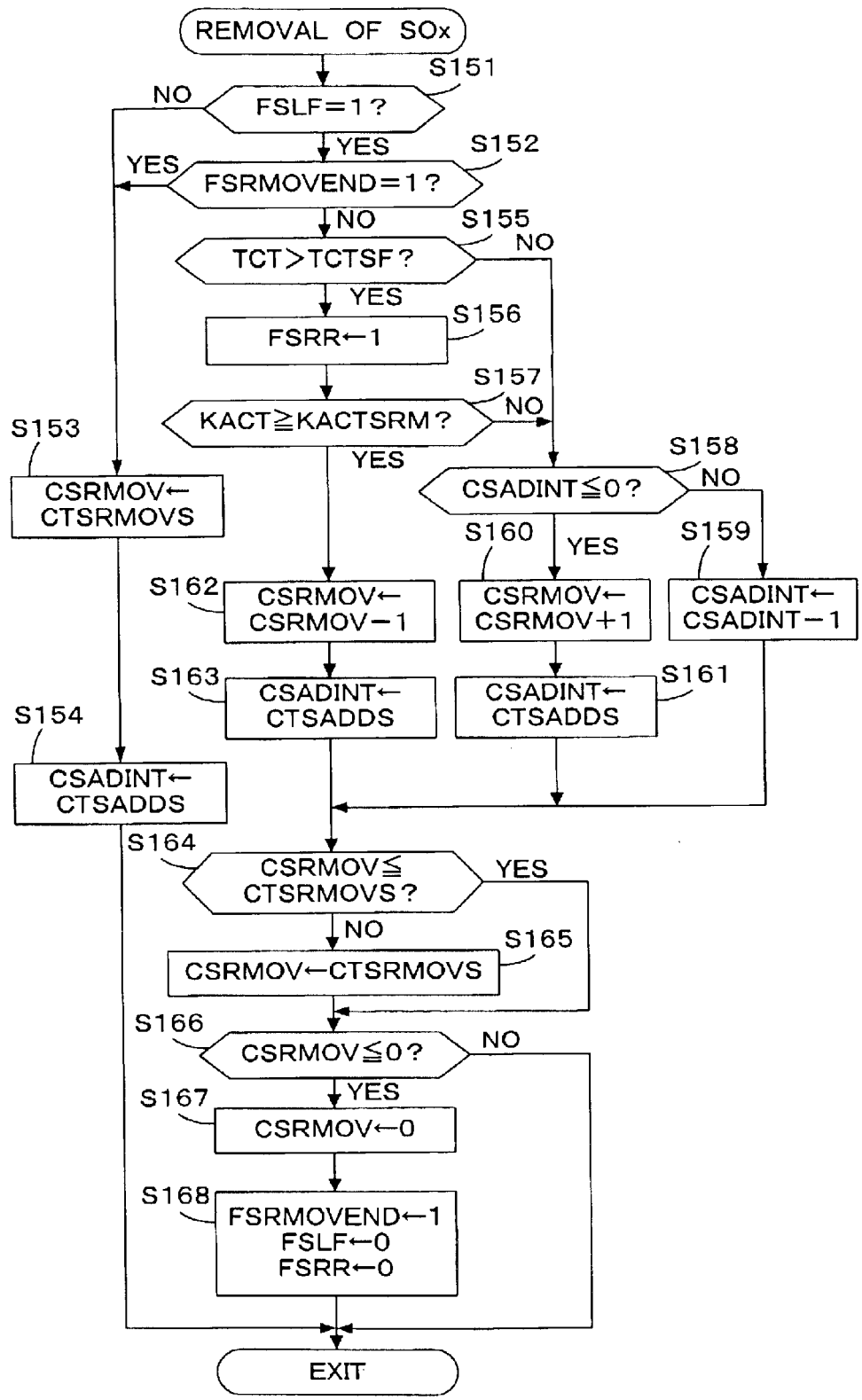
FIG. 14 is a flowchart showing a program for removing SOx.

In step S109, it is determined whether or not a SOx removal end flag FSRMOVEND is "1." The flag FSRMOVEND is set to "1" when the SOx removal process shown in FIG. 14 has been completed. If FSRMOVEND is "0," which indicates that the SOx removal process has not been completed, the program proceeds to step S118, and a second prejudgment flag FPREJUD2 is set to "1" without substantially executing a second prejudgment (step S118). Thereafter, the program proceeds to step S119.

If FSRMOVEND is "1" in step S109, which indicates that the SOx removal process has been completed, it is determined whether or not the second prejudgment flag FPREJUD2 is "1" (step S110). If FPREJUD2 is "1," a fourth exhaust amount parameter GAIRLVO2 is set to "0" (step S112), and the program proceeds to step S119.

If FPREJUD2 is "0" in step S10, it is determined whether or not the downstream O2 sensor output LVO2 is greater than or equal to a third downstream reference value LVO2LNC (e.g., 0.3 V) (step S111). If the answer to step S111 is negative (NO), the program proceeds to step S112. If the answer to step S111 is affirmative (YES), the fourth exhaust amount parameter GAIRLVO2 is calculated from Eq. (7) shown below (step S113).

$$GAIRLVO2 = GAIRLVO2 + (TIM \times KPA) \quad (7)$$

Thereafter, it is determined whether or not the fourth exhaust amount parameter GAIRLVO2 is greater than or equal to a fourth determination threshold GALVO2 (step S114). If GAIRLVO2 is less than GALVO2, the program proceeds directly to step S119. If GAIRLVO2 is greater than or equal to GALVO2, it is determined whether or not the downstream O2 sensor output LVO2 is greater than or equal to a fourth downstream reference value LVO2SLF (e.g., 0.7 V) (step S115).

If LVO2 is greater than or equal to LVO2SLF, it is determined that the NOx removing device 15 is normal.

Then, a second prejudgment OK flag FOK105S is set to "1" and a second prejudgment NG flag FNG105S is set to "0" (step S116). Thereafter, the program proceeds to step S118. On the other hand, if LVO2 is less than LVO2SLF, it is determined that the NOx removing device 15 is deteriorated. Then, the second prejudgment NG flag FNG105S is set to "1" and the second prejudgment OK flag FOK105S is set to "0" (step S117). Thereafter, the program proceeds to step S118.

In step S118, the second prejudgment flag FPREJUD2 is set to "1," so as to indicate that the second prejudgment has been completed.

In step S119, it is determined whether or not the first prejudgment flag FPREJUD1 is "1." If FPREJUD1 is "1," it is determined whether or not the second prejudgment flag FPREJUD2 is "1" (step S120). If the first prejudgment flag FPREJUD1 or the second prejudgment flag FPREJUD2 is "0," this process ends. If the second prejudgment flag FPREJUD2 is "1," the program proceeds from step S120 to step S121.

In step S121, it is determined whether or not an O2 sensor failure flag FFSDF103 is "1." The flag FFSDF103 is set to "1" when the downstream O2 sensor 19 is determined to fail. If the answer to step S121 is affirmative (YES), that is, if the downstream O2 sensor 19 is determined to fail, the program proceeds directly to step S135, in which the deterioration determination end flag FENDF105 is set to "1." Further, all of the execution condition flags, FMCNDF105, the first prejudgment flag FPREJUD1, and the second prejudgment flag FPREJUD2 are set to "0". Then, this process ends. Accordingly, the deterioration determination process is suspended.

If FFSDF103 is "0" in step S121, which indicates that the downstream O2 sensor 19 is determined to fail, it is determined whether or not an O2 sensor OK flag FOKF103 is "1" (step S122). The O2 sensor OK flag FOKF103 is set to "1" when the downstream O2 sensor 19 is determined to be normal. If FOKF103 is "0," which indicates that the downstream O2 sensor 19 is not determined to be normal, the enrichment continuation flag FRSPEXT is set to "1," so as to continue the air-fuel ratio enrichment for executing the failure determination of the downstream O2 sensor 19 (step S123). Thereafter, this process ends.

If FOKF103 is "1," which indicates that the downstream O2 sensor 19 is determined to be normal, it is determined whether or not the concentration determination end flag FSLFEND is "1" (step S124). If FSLFEND is "0," this process ends. If FSLFEND is "1," which indicates that the SOx concentration determination is completed, it is determined whether or not the high concentration flag FSLF is "1" (step Si 25).

If FSLF is "0," which indicates that the SOx concentration is low, the SOx removal end flag FSRMOVEND is set to "0" (step S126). Next, it is determined whether or not the first prejudgment NG flag FNG105P is "1" (step Si 27). If the answer to step S127 is affirmative (YES), it is determined that the NOx removing device 15 is deteriorated. Then, the deterioration flag FFSDF105 is set to "1," the normality flag FOKF105 is set to "0," and the end flag FDONEF105 is set to "1" (step S134). Thereafter, the program proceeds to step S135. If the answer to step S127 is negative (NO), it is determined whether or not the first prejudgment OK flag FOK105P is "1" (step S128). If the answer to step S128 is negative (NO), this process ends. If the answer to step S128 is affirmative (YES), it is determined that the NOx removing device 15 is normal. Then, the normality flag FOKF105 is set to "1," the deterioration flag FFSDF105 is set to "0," and the end flag FDONEF105 is set to "1" (step S133). Thereafter, the program proceeds to step S135.

If FSLF is "1" in step S125, which indicates that the SOx concentration is high, it is determined whether or not the SOx removal end flag FSRMOVEND is "1" (step S129). If FSRMOVEND is "0," which indicates that the SOx removal process has not been completed, the program proceeds directly to step S135 to end the deterioration determination.

If FSRMOVEND is "1" in step S129, which indicates that the SOx removal process has been completed, the SOx removal end flag FSRMOVEND is returned to "0" (step S130), and it is determined whether or not the second prejudgment NG flag FNG105S is "1" (step S131). If FNG105S is "1," it is determined that the NOx removing device 15 is deteriorated, and the program proceeds to step S134. If FNG105S is "0," it is determined whether or not the second prejudgment OK flag FOK105S is "1" (step S132). If the answer to step S132 is negative (NO), this process ends. If the answer to step S132 is affirmative (YES), it is determined that the NOx removing device 15 is normal, and the program proceeds to step S133.

The process of FIGS. 8 and 9 is summarized as follows:

1) If it is not determined that the SOx concentration is high by the process of FIG. 6 (FSLF is "0"), the second prejudgment is not executed, but the result of the first prejudgment becomes the result of the deterioration determination. That is, if the downstream O2 sensor output LVO2 is less than or equal to the second downstream reference value LVO2LNCH, at the time (t14 shown in FIG. 13) the third exhaust amount parameter GALNCS (corresponding to an accumulated exhaust amount measured from the time the upstream O2 sensor output SVO2 has exceeded the fourth upstream reference value SVO2LNCH) has reached the third determination threshold GALNCHOK, it is determined that the NOx removing device 15 is normal. If the downstream O2 sensor output LVO2 is greater than the second downstream reference value LVO2LNCH at the determination time t14, it is determined that the NOx removing device 15 is deteriorated.

2) If it is determined that the SOx concentration is high in the process of FIG. 6 (FSLF is "1"), the execution condition flag FMCNDF105 is returned to "0" (steps S129 and S135), unless the SOx removal process has been completed, thereby suspending the deterioration determination process. That is, if the deterioration determination based on the O2 sensor output is executed in the condition where the SOx concentration is high and the high Sox concentration has a great effect on the O2 sensor output, the possibility of improper determination becomes high. Accordingly, by suspending the deterioration determination in this case, the improper determination can be prevented.

If the execution condition of the deterioration determination is satisfied after completing the SOx removal process, the second prejudgment (steps S110 to S117) is executed, and the result of the second prejudgment becomes the result of the deterioration determination. That is, if the downstream O2 sensor output LVO2 is greater than or equal to the fourth downstream reference value LVO2SLF, at the time (determination time tDET2 (not shown)) the fourth exhaust amount parameter GAIRLVO2 (corresponding to an accumulated exhaust amount measured from the time the downstream O2 sensor output LVO2 has exceeded the third downstream reference value LVO2LNC) has reached the fourth determination threshold GALVO2, it is determined that the NOx removing device 15 is normal. If the downstream O2 sensor output LVO2 is less than the fourth downstream reference value LVO2SLF at the determination time tDET2, it is determined that the NOx removing device 15 is deteriorated.

When the SOx concentration is high and the NOx removing device 15 is deteriorated, it has been experimentally confirmed that the downstream O2 sensor output LVO2 does not reach a value indicative of an exhaust rich condition by the effect of SOx contained in the exhaust gases, even after execution of the SOx removal process for the NOx removing device 15. Accordingly, when the downstream O2 sensor output LVO2 is less than the fourth downstream reference value LVO2SLF at the determination time tDET2, it is determined that the NOx removing device 15 is deteriorated.

3) If it is determined that the downstream O2 sensor 19 has failed (FFSDF103 is "1"), the deterioration determination is suspended, since proper determination of deterioration cannot be expected when the downstream O2 sensor 19 has failed. Further, if the OK determination of the downstream O2 sensor 19 is not made at the time t14 (or tDET2), the enrichment continuation flag FRSPEXT is set to "1" (steps S122 and S123) to extend the air-fuel ratio enrichment for the failure determination for the downstream O2 sensor 19.

FIGS. 10A to 10K are time charts for illustrating the operation in the case that the SOx concentration is not determined to be high in the process of FIG. 6. In these time charts, the solid lines correspond to the case where the downstream O2 sensor 19 is normal, and the broken lines correspond to the case where the downstream O2 sensor 19 has failed due to short circuit (a failure such that the sensor output LVO2 remains "0").

At time t11, the execution condition of the deterioration determination is satisfied and the execution condition flag FMCNDF105 is set to "1." At time t12, the upstream O2 sensor output SVO2 exceeds the fourth upstream reference value SVO2LNCH and the measurement of the third exhaust amount parameter GALNCS is started. At time t13, the SOx concentration determination process (FIG. 6) is completed and the concentration determination end flag FSLFEND is set to "1."

At time the third exhaust amount parameter GALNCS reaches the third determination threshold GALNCHOK (t14), the downstream O2 sensor output LVO2 is at the low level, so that the first prejudgment OK flag FOK105P is set to "1" (although not shown, the first prejudgment flag FPREJUD1 is also set to "1" at the same time). At this time, the downstream O2 sensor 19 is not determined to be normal (FOKF103 is "0"), so that the enrichment continuation flag FRSPEXT is set to "1".

At time t15, the downstream O2 sensor output LVO2 exceeds a normality determination reference value LVO2LNVH (e.g., 0.7 V), so that the downstream O2 sensor 19 is determined to be normal. Accordingly, the O2 sensor OK flag FOKF103 is set to "1," and the normality flag FOKF105 is set to "1". At the same time, the enrichment continuation flag FRSPEXT is returned to "0" in the O2 sensor failure diagnosis process (not shown).

In the case where the downstream O2 sensor 19 has failed, the air-fuel ratio enrichment is further continued as shown by the broken line. At time t16 after a predetermined time period TMRSPEXT elapsed from time t14, it is determined that the downstream O2 sensor 19 has failed (the O2 sensor failure flag FFSDF103 is set to "1"). In this case, the normality flag FOKF105 is maintained at "0," that is, the normality determination for the NOx removing device 15 is not made.

FIG. 14 is a flowchart of the SOx removal process. This process is executed by the CPU 5b at predetermined time intervals (e.g., 100 msec). During execution of the SOx removal process (when FSLF is "1" and FSRMOVEND is "0"), the lean operation is inhibited (see FIG. 15).

In step S151, it is determined whether or not the high concentration flag FSLF is "1." If FSLF is "0," a first downcounter CSRMOV is set to a first predetermined value CTSRMOVS (e.g., 6000) (step S153), and a second downcounter CSADINT is set to a second predetermined value CTSADDS (e.g., 48) (step S154). Thereafter, this process ends. The first predetermined value CTSRMOVS is set to a value corresponding to the time during which the absorbed SOx can be completely removed, even when the amount of SOx absorbed by the NOx removing device 15 is maximum (in the saturated condition).

If FSLF is "1" in step S151, which indicates that the SOx concentration is determined to be high, it is determined whether or not the SOx removal end flag FSRMOVEND is "1" (step S152). If the SOx removal process has already been completed, the answer to step S152 is affirmative (YES), and the program proceeds to step S153. If FSRMOVEND is "0," it is determined whether or not an estimated temperature TCT of the NOx removing device 15 is higher than a predetermined temperature TCTSF (e.g., 600°) (step S155). The estimated temperature TCT is calculated in another process (not shown), e.g., by retrieving a temperature map set according to engine operating conditions, specifically, engine speed NE and engine load (absolute intake pressure PBA). Alternatively, a temperature sensor for detecting the temperature of the NOx removing device 15 may be provided to use a detected temperature instead of the estimated temperature TCT.

If TCT is less than or equal to TCTSF in step S155, it is determined whether or not the value of the second downcounter CSADINT is less than or equal to "0" (step S158). Initially, CSADINT is greater than "0," so that the second downcounter CSADINT is decremented by "1" (step S159), and the program proceeds to step S164. When the value of the second downcounter CSADINT becomes "0," the program proceeds from step S158 to step S160, in which the first downcounter CSRMOV is incremented by "1." Thereafter, the second downcounter CSADINT is set to the second predetermined value CTSADDS (step S161), and the program proceeds to step S164.

If TCT is greater than TCTSF in step S155, the SOx removal enrichment flag FSRR is set to "1" to set the air-fuel ratio to a value in the rich region with respect to the stoichiometric ratio (step S156) (see steps S10 and S29 shown in FIG. 2). Thereafter, it is determined whether or not the detected equivalent ratio KACT is greater than or equal to a predetermined equivalent ratio KACTSRM (e.g., 1.03) (step S157). If KACT is less than KACTSRM, the program proceeds to step S158. If KACT is greater than or equal to KACTSRM, the first downcounter CSRMOV is decremented by "1" (step S162), and the second downcounter CSADINT is set to the second predetermined value CTSADDS (step S163). Thereafter, the program proceeds to step S164.

In step S164, it is determined whether or not the value of the first downcounter CSRMOV is less than or equal to the first predetermined value CTSRMOVS. If CSRMOV is less than or equal to CTSRMOVS, the program proceeds directly to step S166. If CSRMOV is greater than CTSRMOVS, the first downcounter CSRMOV is set to the first predetermined value CTSRMOVS (step S165), and the program proceeds to step S166.

In step S166, it is determined whether or not the value of the first downcounter CSRMOV is less than or equal to "0".

If CSRMOV is greater than 0, the program ends. When the value of the first downcounter CSRMOV becomes "0," it is determined that the SOx removal process has been completed, and steps S167 and S168 are then executed. That is, the first downcounter CSRMOV is set to "0" (step S167), and the SOx removal end flag FSRMOVEND is set to "1." Further, the high concentration flag FSLF is returned to "0," and the SOx removal enrichment flag FSRR is returned to "0" (step S168). Thereafter, this process ends.

According to the process of FIG. 14, the amount of SOx accumulated in the NOx removing device 15 is estimated by the first downcounter CSRMOV. When the value of the first downcounter CSRMOV becomes "0," it is determined that the accumulated SOx has been removed, and the SOx removal end flag FSRMOVEND is set to "1." However, when the estimated temperature TCT is less than or equal to the predetermined temperature TCTSF or when the detected equivalent ratio KACT is less than the predetermined equivalent ratio KACTSRM, SOx is not removed, but conversely accumulated into the NOx removing device 15. Accordingly, every time the value of the second downcounter CSADINT becomes "0," the first downcounter CSRMOV is incremented. Since the rate of accumulation of SOx is lower than the rate of removal of SOx, the increment of the first downcounter CSRMOV is executed at a frequency which is lower than the execution frequency of the decrement.

When it is determined that the SOx concentration is high, the SOx removal process is executed to thereby prevent improper determination such that a reduction in performance of the NOx removing device 15 due to the accumulation of SOx is improperly determined as an aged deterioration of the NOx removing device 15.

Figure 15:
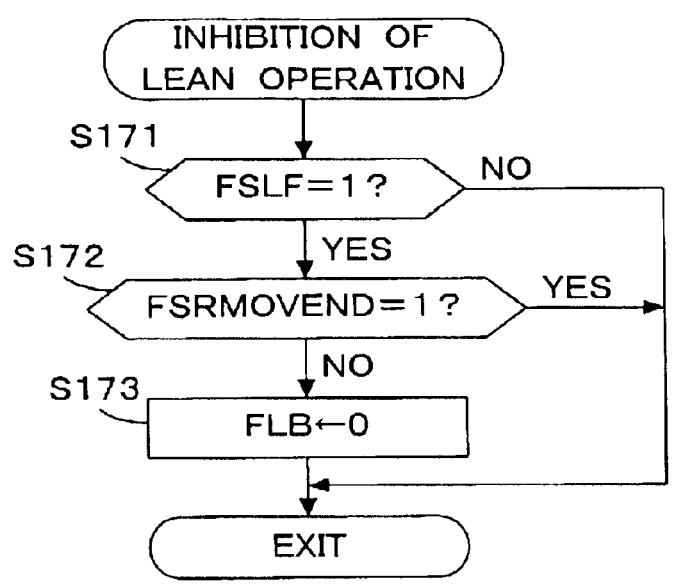
FIG. 15 is a flowchart showing a program for inhibiting a lean operation.

FIG. 15 is a flowchart showing a program for inhibiting the lean operation in which the air-fuel ratio is set in a lean region with respect to the stoichiometric ratio, during execution of the SOx removal process. This program is executed by the CPU 5b in synchronism with the generation of a TDC signal pulse. This process is executed immediately after the lean operation permission determination process (not shown), in which the lean operation flag FLB is set according to engine operating conditions. That is, even when the lean operation flag FLB is set to "1" in the lean operation permission determination process, this flag FLB is returned to "0" in this process during execution of the SOx removal process. By inhibiting the lean operation, the SOx removal can be performed.

In step S171, it is determined whether or not the high concentration flag FSLF is "1." If FSLF is "1," which indicates that the SOx concentration is determined to be high, it is determined whether or not the SOx removal end flag FSRMOVEND is "1" (step S172). If FSLF is "1" and FSRMOVEND is "0," which indicates that the SOx removal process is being executed, the lean operation flag FLB is set to "0" (step S173). If FSLF is "0" or FSRMOVEND is "1," this process ends.

In this preferred embodiment, the ECU 5 constitutes the air-fuel ratio changing means, the sulfur oxide determining means, the deterioration determining means, the inhibiting means, and the sulfur oxide removing means. More specifically, Steps S20 and S26 in FIG. 2 correspond to the air-fuel ratio changing means. The process of FIG. 6 corresponds to the sulfur oxide determining means. The steps S102 to S118 in FIG. 8 and the steps S127, S128, and S131 to S134 in FIG. 9 correspond to the deterioration determining means. Steps S125, S129, and S135 in FIG. 9 correspond to the inhibiting means. The process of FIG. 14 corresponds to the sulfur oxide removing means.

Second Preferred Embodiment

Figure 16:
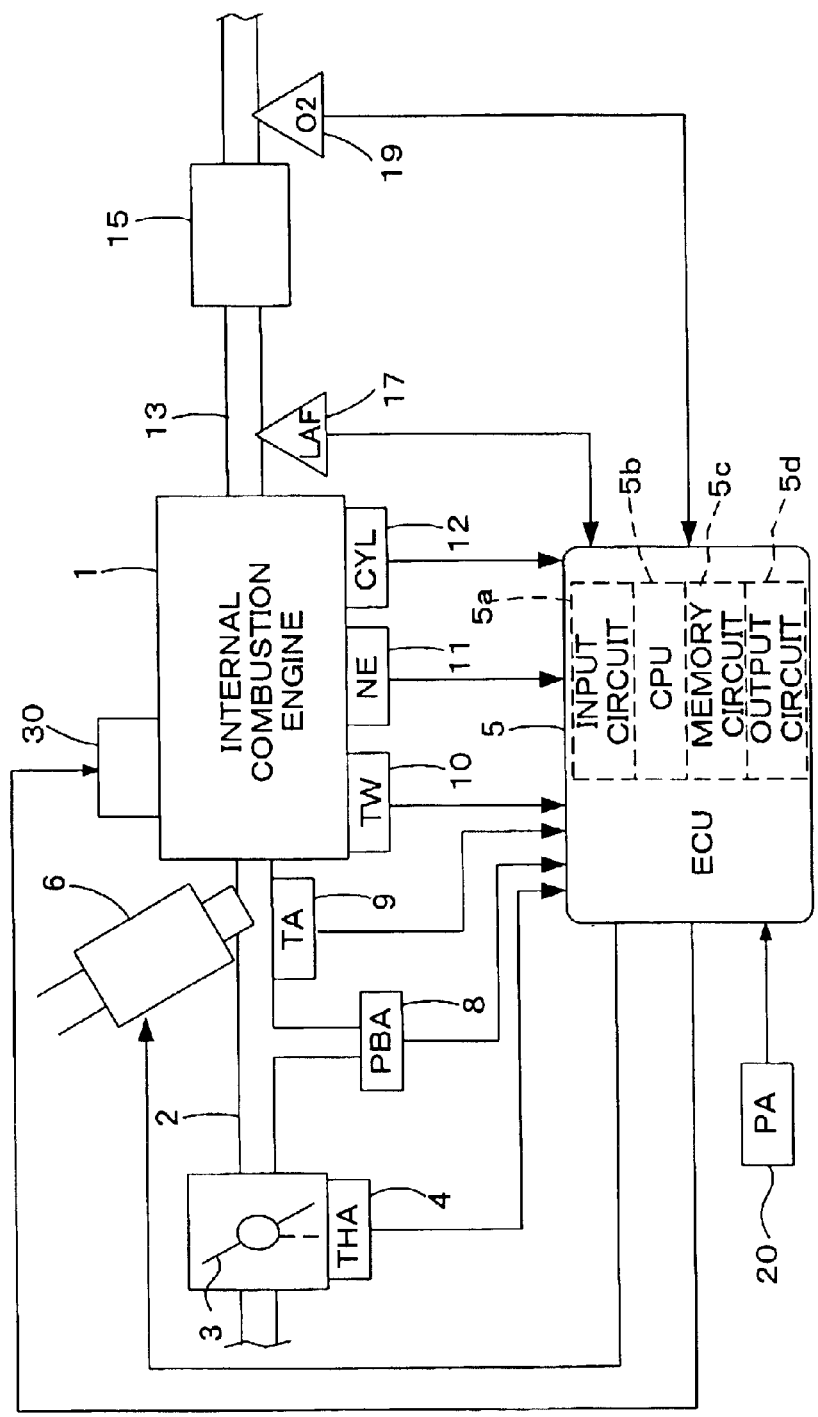
FIG. 16 is a schematic diagram showing the configuration of an internal combustion engine and a control system therefor according to a second preferred embodiment of the present invention.

FIG. 16 is a schematic diagram showing the configuration of an internal combustion engine and a control system therefor, including an exhaust emission control system according to a second preferred embodiment of the present invention. The configuration shown in FIG. 16 is different from the configuration of the first preferred embodiment shown in FIG. 1 in the point that the three-way catalyst 14 and the upstream O2 sensor 18 are not provided in the exhaust pipe 13. The second preferred embodiment is similar to the first preferred embodiment except the following aspects.

In this preferred embodiment, the SOx concentration determination is performed according to the output LVO2 from the downstream O2 sensor 19. That is, the process of FIG. 6 is executed by using the downstream O2 sensor output LVO2 instead of the upstream O2 sensor output SVO2 to perform the SOx concentration determination.

Further, the deterioration determination for the NOx removing device 15 is executed according to the output VLAF from the LAF sensor 17 and the output LVO2 from the downstream O2 sensor 19. That is, the calculation of the third exhaust amount parameter GALNCS (step S103) in the deterioration determination subroutine (FIGS. 8 and 9) is executed by the process shown in FIG. 17.

Figure 17:
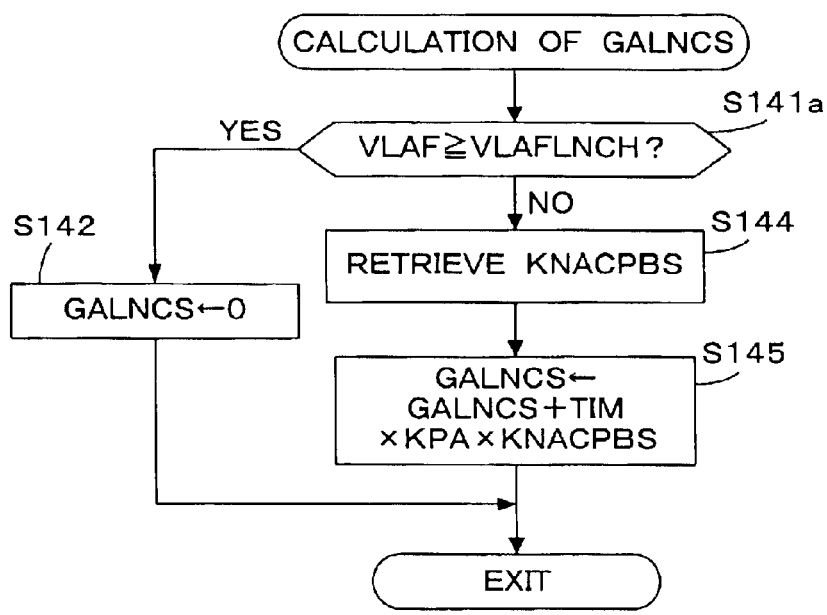
FIG. 17 is a flowchart showing a program for calculating an exhaust amount parameter (GALNCS) in the second preferred embodiment.

In step S141a in FIG. 17, it is determined whether or not the LAF sensor output VLAF is greater than or equal to a reference value VLAFLNCH. If VLAF is greater than or equal to VLAFLNCH, the program proceeds to step S142, in which the third exhaust amount parameter GALNCS is set to "0." If the LAF sensor output VLAF becomes lower than the reference value VLAFLNCH, steps S144 and S145 are executed to accumulate the third exhaust amount parameter GALNCS.

The reference value VLAFLNCH is set to a value corresponding to an air-fuel ratio (e.g., 14.4) slightly leaner than the air-fuel ratio (about 14.3) corresponding to the deterioration determination enrichment predetermined value KCMDRM of the target air-fuel ratio coefficient KCMD. In this preferred embodiment, the LAF sensor output VLAF has a characteristic such that it increases with an increase in the oxygen concentration (an increase in the air-fuel ratio). Accordingly, by the process of FIG. 17, the accumulation of the third exhaust amount parameter GALNCS is started at the time the LAF sensor output VLAF has changed from a value indicative of a lean air-fuel ratio to a value indicative of the rich air-fuel ratio corresponding to the deterioration determination enrichment predetermined value KCMDRM.

Thus, the third exhaust amount parameter GALNCS is calculated according to the LAF sensor output VLAF, and the deterioration determination for the NOx removing device 15 is executed similarly to the first preferred embodiment.

In the execution condition determination process (FIGS. 4 and 5), the upstream O2 sensor output SVO2 is replaced by the LAF sensor output VLAF, and the reference values in steps S55 and S64 are changed into values which is suitable for the LAF sensor output VLAF. Further, the inequality signs in steps S35 and S64 are inverted. Thus, the execution condition for the deterioration determination can be determined by using the LAF sensor output VLAF.

As described above, the SOx concentration determination is executed according to the output from the downstream O2 sensor 19 provided downstream of the NOx removing device 15 in this preferred embodiment. Further, the deterioration determination of the NOx removing device 15 is executed according to the LAF sensor output VLAF and the downstream O2 sensor output LVO2.

Other Preferred Embodiments

The present invention is not limited to the above preferred embodiments, but various modifications may be made. In the first preferred embodiment described above, the SOx concentration is determined to be high if the first exhaust amount parameter GSLFFIN has reached the first determination threshold GSLFFINR before the upstream O2 sensor output SVO2 exceeds the second upstream reference value SVO2SLF. A timer TSLFFIN for measuring an elapsed time period may be used in place of the first exhaust amount parameter GSLFFIN. More specifically, the measurement of the elapsed time period by the timer TSLFFIN may be started at the time the upstream O2 sensor output SVO2 has reached the first upstream reference value SVO2LNCS, and the SOx concentration may be determined to be high if the value of the timer TSLFFIN has reached a predetermined time period TSLFFINR corresponding to the first determination threshold GSLFFINR before the O2 sensor output SVO2 reaches the second upstream reference value SVO2SLF.

Further, in the first preferred embodiment described above, the accumulation of the second exhaust amount parameter GSLFJUD is started at the time the upstream O2 sensor output SVO2 has exceeded the second upstream reference value SVO2SLF, and the SOx concentration is determined to be high if the O2 sensor output SVO2 becomes lower than the second upstream reference value SVO2SLF before the second exhaust amount parameter GSLFJUD reaches the second determination threshold GASLF. A timer TSLFJUD for measuring an elapsed time period may be used in place of the second exhaust amount parameter GSLFJUD. More specifically, the measurement of the elapsed time period by the timer TSLFJUD may be started at the time the upstream O2 sensor output SVO2 has exceeded the second upstream reference value SVO2SLF, and the SOx concentration may be determined to be high if the O2 sensor output SVO2 becomes lower than the second upstream reference value SVO2SLF before the value of the timer TSLFJUD reaches a predetermined time period TASLF corresponding to the second determination threshold GASLF.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. An exhaust emission control system for an internal combustion engine having an exhaust system, comprising:

NOx removing means provided in said exhaust system of said engine for removing NOx contained in exhaust gases when the air-fuel ratio of an air-fuel mixture to be supplied to said engine is set to a value which is leaner than the stoichiometric ratio;

an oxygen concentration sensor provided in said exhaust system, for detecting an oxygen concentration in the exhaust gases;

air-fuel ratio changing means for changing the air-fuel ratio of the air-fuel mixture to be supplied to said engine from a value which is leaner than the stoichiometric ratio to a value which is richer than the stoichiometric ratio; and sulfur oxide determining means for determining whether or not a sulfur oxide concentration in the exhaust gases is high according to a comparison between a predetermined transient time period and a transient time period, said transient time period being determined based on the oxygen concentration detected by said oxygen concentration sensor after the air-fuel ratio is changed by said air-fuel ratio changing means.

2. An exhaust emission control system for an internal combustion engine having an exhaust system, comprising:

NOx removing means provided in said exhaust system of said engine for removing NOx contained in exhaust gases when the air-fuel ratio of an air-fuel mixture to be supplied to said engine is set to a value which is leaner than the stoichiometric ratio;

an oxygen concentration sensor provided in said exhaust system, for detecting an oxygen concentration in the exhaust gases;

air-fuel ratio changing means for changing the air-fuel ratio of the air-fuel mixture to be supplied to said engine from a value which is leaner than the stoichiometric ratio to a value which is richer than the stoichiometric ratio: and sulfur oxide determining means for determining whether or not a sulfur oxide concentration in the exhaust gases is high according to a transient characteristic of the oxygen concentration detected by said oxygen concentration sensor after the air-fuel ratio is changed by said air-fuel ratio changing means, wherein said air-fuel ratio changing means changes the air-fuel ratio from a value which is leaner than the stoichiometric ratio to a value which is slightly richer than the stoichiometric ratio, and said sulfur oxide determining means determines that the sulfur oxide concentration is high when a transient time period from the time the oxygen concentration sensor has become lower than a first reference value, to the time the oxygen concentration detected by said oxygen sensor reaches a second reference value, which is less than the first reference value, is longer than a predetermined transient time period.

3. An exhaust emission control system for an internal combustion engine having an exhaust system, comprising:

NOx removing means provided in said exhaust system of said engine for removing NOx contained in exhaust gases when the air-fuel ratio of an air-fuel mixture to be supplied to said engine is set to a value which is leaner than the stoichiometric ratio;

an oxygen concentration sensor provided in said exhaust system, for detecting an oxygen concentration in the exhaust gases;

air-fuel ratio changing means for changing the air-fuel ratio of the air-fuel mixture to be supplied to said engine from a value which is leaner than the stoichiometric ratio to a value which is richer than the stoichiometric ratio; and sulfur oxide determining means for determining whether or not a sulfur oxide concentration in the exhaust gases is high according to a transient characteristic of the oxygen concentration detected by said oxygen concentration sensor after the air-fuel ratio is changed by said air-fuel ratio changing means, wherein said sulfur dioxide determining means determines that the sulfur oxide concentration is high, when the oxygen concentration detected by said oxygen concentration sensor becomes lower than a concentration determination reference value, and thereafter exceeds the concentration determination reference value within a predetermined time period from the time the oxygen concentration becomes lower than the concentration determination reference value.

4. An exhaust emission control system according to claim 1, wherein said air-fuel ratio changing means changes the air-fuel ratio from a value which is leaner than the stoichiometric ratio to a value which is slightly richer than the stoichiometric ratio.

5. An exhaust emission control system according to claim 1, further comprising:

deterioration determining means for determining the deterioration of said NOx removing means according to the output from said oxygen concentration sensor; and inhibiting means for inhibiting the deterioration determination by said deterioration determining means when said sulfur oxide determining means determines that the sulfur oxide concentration is high.

6. An exhaust emission control system according to claim 1, further comprising sulfur oxide removing means for executing a process for removing sulfur oxide accumulated in said NOx removing means when said sulfur oxide determining means determines that the sulfur oxide concentration is high.

7. An exhaust emission control system for an internal combustion engine having an exhaust system, comprising:

a three-way catalyst provided in said exhaust system of said engine for purifying exhaust gases;

NOx removing means provided downstream of said three-way catalyst for removing NOx contained in the exhaust gases when the air-fuel ratio of an air-fuel mixture to be supplied to said engine is set to a value which is leaner than a stoichiometric ratio;

an oxygen concentration sensor provided between said three-way catalyst and said NOx removing means, for detecting an oxygen concentration in the exhaust gases;

air-fuel ratio changing means for changing the air-fuel ratio of the air-fuel mixture from a value which is leaner than the stoichiometric ratio to a value which is richer than the stoichiometric ratio; and sulfur oxide determining means for determining whether or not a sulfur oxide concentration in the exhaust gases is high according to a comparison between a predetermined transient time period and a transient time period, said transient time period being determined based on the oxygen concentration detected by said oxygen concentration sensor after the air-fuel ratio is changed by said air-fuel ratio changing means.

8. An exhaust determination control system according to claim 7, wherein said sulfur oxide determining means determines that the sulfur oxide concentration is high, when the oxygen concentration detected by said oxygen concentration sensor becomes lower than a first reference value and fails to reach a second reference value which is less than the first reference value within a predetermined time period elapsed from the time the oxygen concentration becomes lower than the first reference value.

9. An exhaust determination control system according to claim 7, wherein said sulfur oxide determining means determines that the sulfur oxide concentration is high, when the oxygen concentration detected by said oxygen concentration sensor becomes lower than a concentration determination reference value, and thereafter exceeds the concentration determination reference value within a predetermined time period from the time the oxygen concentration becomes lower than the concentration determination reference value.

10. An exhaust determination control system according to claim 7, wherein said air-fuel ratio changing means changes the air-fuel ratio from a value which is leaner than the stoichiometric ratio to a value which is slightly richer than the stoichiometric ratio.

11. A computer program for causing a computer to carry out a method for determining a sulfur oxide concentration in exhaust gases from an internal combustion engine that is provided with a NOx removing device in an exhaust system of said engine for removing NOx contained in the exhaust gases when the air-fuel ratio of an air-fuel mixture to be supplied to said engine is set to a value which is leaner than the stoichiometric ratio, said method comprising the steps of:

a) changing the air-fuel ratio of the air-fuel mixture to be supplied to said engine from a value which is leaner than the stoichiometric ratio to a value which is richer than the stoichiometric ratio;

b) detecting an oxygen concentration in the exhaust gases by an oxygen concentration sensor provided in said exhaust system; and c) determining whether or not the sulfur oxide concentration in the exhaust gases is high according to a comparison between a predetermined transient time period and a transient time period, said transient time period being determined based on the oxygen concentration detected by said oxygen concentration sensor after changing the air-fuel ratio.

12. A computer program for causing a computer to carry out a method for determining a sulfur oxide concentration in exhaust gases from an internal combustion engine that is provided with a NOx removing device in an exhaust system of said engine for removing NOx contained in the exhaust gases when the air-fuel ratio of an air-fuel mixture to be supplied to said engine is set to a value which is leaner than the stoichiometric ratio, said method comprising the steps of:

a) changing the air-fuel ratio of the air-fuel mixture to be supplied to said engine from a value which is leaner than the stoichiometric ratio to a value which is richer than the stoichiometric ratio;

b) detecting an oxygen concentration in the exhaust gases by an oxygen concentration sensor provided in said exhaust system; and c) determining whether or not the sulfur oxide concentration in the exhaust gases is high according to a transient characteristic of the oxygen concentration detected by said oxygen concentration sensor after changing the air-fuel ratio, wherein the air-fuel ratio is changed from a value which is leaner than the stoichiometric ratio to a value which is slightly richer than the stoichiometric ratio, and the sulfur oxide concentration is determined to be high, when a transient time period from the time the oxygen concentration sensor has become lower than a first reference value, to the time the oxygen concentration detected by said oxygen sensor reaches a second reference value, which is less than the first reference value, is longer than a predetermined transient time period.

13. A computer program for causing a computer to carry out a method for determining a sulfur oxide concentration in exhaust gases from an internal combustion engine that is provided with a NOx removing device in an exhaust system of said engine for removing NOx contained in the exhaust gases when the air-fuel ratio of an air-fuel mixture to be supplied to said engine is set to a value which is leaner than the stoichiometric ratio, said method comprising the steps of:

a) changing the air-fuel ratio of the air-fuel mixture to be supplied to said engine from a value which is leaner than the stoichiometric ratio to a value which is richer than the stoichiometric ratio;

b) detecting an oxygen concentration in the exhaust gases by an oxygen concentration sensor provided in said exhaust system; and c) determining whether or not the sulfur oxide concentration in the exhaust gases is high according to a transient characteristic of the oxygen concentration detected by said oxygen concentration sensor after changing the air-fuel ratio, wherein the sulfur oxide concentration is determined to be high, when the oxygen concentration detected by said oxygen concentration sensor becomes lower than a concentration determination reference value, and thereafter exceeds the concentration determination reference value within a predetermined time period from the time the oxygen concentration detected by said oxygen concentration sensor becomes lower than the concentration determination reference value.

14. A computer program according to claim 11, wherein the air-fuel ratio is changed from a value which is leaner than the stoichiometric ratio to a value which is slightly richer than the stoichiometric ratio.

15. A computer program according to claim 11, wherein said method further includes the steps of:

e) determining the deterioration of said NOx removing device according to the oxygen concentration detected by said oxygen concentration sensor; and f) inhibiting the deterioration determination when the sulfur oxide concentration is determined to be high.

16. A computer program according to claim 11, wherein the method further includes the step of executing a process for removing sulfur oxide accumulated in said NOx removing device when the sulfur oxide concentration is determined to be high.

17. A computer program for causing a computer to carry out a method for determining a sulfur oxide concentration in exhaust gases from an internal combustion engine having a three-way catalyst provided in an exhaust system of said engine, for purifying exhaust gases, and a NOx removing device provided downstream of said three-way catalyst, for removing NOx contained in the exhaust gases when the air-fuel ratio of an air-fuel mixture to be supplied to said engine is set to a value which is leaner than the stoichiometric ratio, said method comprising the steps of:

a) changing the air-fuel ratio of the air-fuel mixture to be supplied to said engine from a value which is leaner than the stoichiometric ratio to a value which is richer than the stoichiometric ratio;

b) detecting an oxygen concentration in the exhaust gases by an oxygen concentration sensor provided between said three-way catalyst and said NOx removing device; and c) determining whether or not a sulfur oxide concentration in the exhaust gases is high according to a comparison between a predetermined transient time period and a transient time period, said transient time period being determined based on the oxygen concentration detected by said oxygen concentration sensor after changing the air-fuel ratio.

18. A computer program according to claim 17, wherein the sulfur oxide concentration is determined to be high, when the oxygen concentration detected by said oxygen concentration sensor becomes lower than a concentration determination reference value, and thereafter exceeds the concentration determination reference value within a predetermined time period from the time the oxygen concentration detected by said oxygen concentration sensor becomes lower than the concentration determination reference value.

19. A computer program according to claim 17, wherein the sulfur oxide concentration is determined to be high, when the oxygen concentration detected by said oxygen concentration sensor becomes lower than a concentration determination reference value, and thereafter exceeds the concentration determination reference value within a predetermined time period from the time the oxygen concentration detected by said oxygen concentration sensor becomes lower than the concentration determination reference value.

20. A computer program according to claim 17, wherein the air-fuel ratio is changed from a value which is leaner than the stoichiometric ratio to a value which is slightly richer than the stoichiometric ratio.

21. An exhaust emission control system for an internal combustion engine having an exhaust system, comprising:
   a NOx removing device provided in said exhaust system of said engine for removing NOx contained in exhaust gases when the air-fuel ratio of an air-fuel mixture to be supplied to said engine is set to a value which is leaner than the stoichiometric ratio;
   an oxygen concentration sensor provided in said exhaust system, for detecting an oxygen concentration in the exhaust gases;
   an air-fuel ratio changing module for changing the air-fuel ratio of the air-fuel mixture to be supplied to said engine from a value which is leaner than the stoichiometric ratio to a value which is richer than the stoichiometric ratio; and
   a sulfur oxide determining module for determining whether or not a sulfur oxide concentration in the exhaust gases is high according to a comparison between a predetermined transient time period and a transient time period, said transient time period being determined based on the oxygen concentration detected by said oxygen concentration sensor after the air-fuel ratio is changed by said air-fuel ratio changing module.

22. An exhaust emission control system for an internal combustion engine having an exhaust system, comprising:
   a NOx removing device provided in said exhaust system of said engine for removing NOx contained in exhaust gases when the air-fuel ratio of an air-fuel mixture to be supplied to said engine is set to a value which is leaner than the stoichiometric ratio;
   an oxygen concentration sensor provided in said exhaust system, for detecting an oxygen concentration in the exhaust gases;
   an air-fuel ratio changing module for changing the air-fuel ratio of the air-fuel mixture to be supplied to said engine from a value which is leaner than the stoichiometric ratio to a value which is richer than the stoichiometric ratio; and
   a sulfur oxide determining module for determining whether or not a sulfur oxide concentration in the exhaust gases is high according to a transient characteristic of the oxygen concentration detected by said oxygen concentration sensor after the air-fuel ratio is changed by said air-fuel ratio changing module, wherein said air-fuel ratio changing module changes the air-fuel ratio from a value which is leaner than the stoichiometric ratio to a value which is slightly richer than the stoichiometric ratio, and said sulfur oxide determining module determines that the sulfur oxide concentration is high, when a transient time period from the time the oxygen concentration sensor has become lower than a first reference value to the time the oxygen concentration detected by said oxygen sensor reaches a second reference value which is less than the first reference value, is longer than a predetermined transient time period.

23. An exhaust emission control system for an internal combustion engine having an exhaust system, comprising:
   a NOx removing device provided in said exhaust system of said engine for removing NOx contained in exhaust gases when the air-fuel ratio of an air-fuel mixture to be supplied to said engine is set to a value which is leaner than the stoichiometric ratio;
   an oxygen concentration sensor provided in said exhaust system, for detecting an oxygen concentration in the exhaust gases;
   an air-fuel ratio changing module for changing the air-fuel ratio of the air-fuel mixture to be supplied to said engine from a value which is leaner than the stoichiometric ratio to a value which is richer than the stoichiometric ratio; and
   a sulfur oxide determining module for determining whether or not a sulfur oxide concentration in the exhaust gases is high according to a transient characteristic of the oxygen concentration detected by said oxygen concentration sensor after the air-fuel ratio is changed by said air-fuel ratio changing module, wherein said sulfur oxide determining module determines that the sulfur oxide concentration is high, when the oxygen concentration detected by said oxygen concentration sensor becomes lower than a concentration determination reference value, and thereafter exceeds the concentration determination reference value within a predetermined time period from the time the oxygen concentration becomes lower than the concentration determination reference value.

24. An exhaust emission control system according to claim 21, wherein said air-fuel ratio changing module changes the air-fuel ratio from a value which is leaner than the stoichiometric ratio to a value which is slightly richer than the stoichiometric ratio.

25. An exhaust emission control system according to claim 21, further comprising:
   a deterioration determining module for determining the deterioration of said NOx removing device according to the output from said oxygen concentration sensor; and
   an inhibiting module for inhibiting the deterioration determination by said deterioration determining module when said sulfur oxide determining module determines that the sulfur oxide concentration is high.

26. An exhaust emission control system according to claim 21, further comprising a sulfur oxide removing module for executing a process for removing sulfur oxide accumulated in said NOx removing device when said sulfur oxide determining module determines that the sulfur oxide concentration is high.

27. An exhaust emission control system for an internal combustion engine having an exhaust system, comprising:
   a three-way catalyst provided in said exhaust system of said engine for purifying exhaust gases;
   a NOx removing device provided downstream of said three-way catalyst for removing NOx contained in the exhaust gases when the air-fuel ratio of an air-fuel mixture to be supplied to said engine is set to a value which is leaner than a stoichiometric ratio;

an oxygen concentration sensor provided between said three-way catalyst and said NOx removing device, for detecting an oxygen concentration in the exhaust gases;

an air-fuel ratio changing module for changing the air-fuel ratio of the air-fuel mixture from a value which is leaner than the stoichiometric ratio to a value which is richer than the stoichiometric ratio; and a sulfur oxide determining module for determining whether or not a sulfur oxide concentration in the exhaust gases is high according to a comparison between a predetermined transient time period and a transient time period, said transient time period being determined based on the oxygen concentration detected by said oxygen concentration sensor after the air-fuel ratio is changed by said air-fuel ratio changing module.

28. An exhaust emission control system according to claim 27, wherein said sulfur oxide determining module determines that the sulfur oxide concentration is high, when the oxygen concentration detected by said oxygen concentration sensor becomes lower than a first reference value and fails to reach a second reference value, which is less than the first reference value within a predetermined time period elapsed from the time the oxygen concentration becomes lower than the first reference value.

29. An exhaust emission control system according to claim 27, wherein said sulfur oxide determining module determines that the sulfur oxide concentration is high, when the oxygen concentration detected by said oxygen concentration sensor becomes lower than a concentration determination reference value, and thereafter exceeds the concentration determination reference value within a predetermined time period from the time the oxygen concentration becomes lower than the concentration determination reference value.

30. An exhaust emission control system according to claim 27, wherein said air-fuel ratio changing module changes the air-fuel ratio from a value which is leaner than the stoichiometric ratio to a value which is slightly richer than the stoichiometric ratio.

* * * * *